United States Patent
Ozalevli et al.

(10) Patent No.: US 10,512,130 B1
(45) Date of Patent: Dec. 17, 2019

(54) MULTI-STRING LED DRIVERS AND CURRENT SWITCHING TECHNIQUES

(71) Applicant: Apple Inc., Cupertino, CA (US)

(72) Inventors: Erhan Ozalevli, Santa Clara, CA (US); Behzad Mohtashemi, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/265,401

(22) Filed: Feb. 1, 2019

(51) Int. Cl.
    *H05B 33/08* (2006.01)
    *G09G 3/34* (2006.01)

(52) U.S. Cl.
    CPC ....... *H05B 33/0827* (2013.01); *G09G 3/3406* (2013.01); *H05B 33/0812* (2013.01)

(58) Field of Classification Search
    None
    See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 8,710,752 B2 | 4/2014 | Jin et al. | |
| 9,198,255 B2 | 11/2015 | Kamal et al. | |
| 9,961,742 B2 | 5/2018 | Ahn et al. | |
| 2006/0197753 A1 | 9/2006 | Hotelling | |
| 2014/0070711 A1* | 3/2014 | Xiao | H05B 33/0818 315/186 |
| 2014/0132173 A1* | 5/2014 | Zhang | H05B 33/0818 315/224 |

(Continued)

FOREIGN PATENT DOCUMENTS

| | | |
|---|---|---|
| JP | 2000-163031 | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," Proceedings of CHI: ACM Conference on Human Factors in Computing Systems, pp. 21-25.

(Continued)

*Primary Examiner* — Jany Richardson

(57) ABSTRACT

LED backlight circuits for a display and methods for operating the circuits are disclosed. The LED backlight circuit includes a set of drivers and a set of LED strings. A driver can be capable of coupling to any of the LED strings at a given time. Examples of the disclosure can include different configurations of drivers. In some instances, the driver may include an auxiliary transistor that allows the driver to settle before being switched to control a respective LED string. In some examples, the driver can include switches and an idle transistor that can be operated such that a low current path through the driver can exist when the driver is not coupled to a LED string.

19 Claims, 19 Drawing Sheets

(56) References Cited

U.S. PATENT DOCUMENTS

2019/0059136 A1* 2/2019 Navabi-Shirazi ............................ H05B 33/0812

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

MULTI-STRING LED DRIVERS AND CURRENT SWITCHING TECHNIQUES

FIELD

This disclosure relates generally to systems, methods, and apparatuses for improving display devices using a backlight controller. More specifically, this disclosure relates to multi-string light emitting diode (LED) drivers and associated current switching techniques.

BACKGROUND

Display screens of various types of technologies, such as liquid crystal displays (LCDs), organic light emitting diode (OLED) displays, etc., can be used as screens or displays for a wide variety of electronic devices, including consumer electronics such as televisions, computers, and handheld devices (e.g., mobile telephones, tablet computers, audio and video players, gaming systems, etc.). LCD devices, for example, can provide a flat display in a relatively thin package that can be suitable for use in a variety of electronic goods. In addition, LED devices may use less power than comparable display technologies, making them suitable for use in battery-powered devices, or in other contexts where it is desirable to minimize power usage.

LCDs generally include a backlight that provides visible light to a liquid crystal layer. The liquid crystal layer can take the light from the backlight and can control the brightness and color at each individual pixel in the display in order to render a desired image. One metric that can be used to judge the performance of a display is the uniformity of color generated by the display over varying levels of brightness. In some displays, the brightness can be adjusted by increasing or decreasing the drive current using a LED driver, which can be referred to as analog dimming. For example, 50% brightness can be achieved by applying a drive current equal to 50% of the maximum current. In some instances, a change in drive current can result in a shift in the wavelength (i.e., color) of the light produced by the display. Additionally, analog dimming may require an analog control signal, which may not be readily available or may require complex circuitry.

Additionally or alternatively, the brightness may be adjusted by using pulse width modulation (PWM) dimming, where the duty cycle of the drive current can be increased or decreased. In some instances, the drive current applied may be equal to 100% of the maximum current. For example, 50% brightness can be achieved by applying a drive current equal to 100% of the maximum current at a 50% duty cycle. The duty cycle in PWM techniques can result in the drive current being applied during an on pulse, and not being applied during an off pulse. The PWM signal can include on pulses that alternate with off pulses. In some instances, the frequency of the PWM signal may need to above a certain threshold frequency (e.g., 100 Hz) to avoid the pulsing of the PWM signal being visible to the human eye. A backlight circuit that includes LED driver(s) that can perform at PWM frequencies much higher (e.g., 50 kHz) than this threshold frequency may be desired.

Additionally, certain devices, such as laptops and monitors, may have high-resolution displays, where global dimming (e.g., uniform dimming across all or the majority of the display) may be desired. Also, the quality of the display may benefit from precise matching of the drive current between LED strings and high linearity when the backlight circuit is operated at high PWM frequencies.

SUMMARY

Disclosed herein is a LED backlight circuit for a display. The LED backlight circuit includes a set of drivers and a set of LED strings. A driver can be capable of coupling to any of the LED strings at a given time. In this manner, the driver that controls a given LED string can change, and the order of which drivers are controlling the strings can be rotated during different rounds and/or clock cycles to reduce any mismatches between the drive currents of the set of LED strings. In some examples, the current mismatches can be reduced by controlling all of the LED strings within a set using the minimum number of drivers required.

Examples of the disclosure can include different configurations of drivers. In some instances, the driver may include an auxiliary transistor that allows the driver to settle before being switched to control a respective LED string. In some examples, the driver can include switches and an idle transistor that can be operated such that a low current path through the driver can exist when the driver is not coupled to a LED string.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

Disclosed herein is a LED backlight circuit for a display. The LED backlight circuit includes a set of drivers and a set of LED strings. A driver can be capable of coupling to any of the LED strings at a given time. In this manner, the driver that controls a given LED string can change, and the order of which drivers are controlling the strings can be rotated during different rounds and/or clock cycles to reduce any mismatches between the drive currents of the set of LED strings. In some examples, the current mismatches can be reduced by controlling all of the LED strings within a set using the minimum number of drivers required.

Examples of the disclosure can include different configurations of drivers. In some instances, the driver may include an auxiliary transistor that allows the driver to settle before being switched to control a respective LED string. In some examples, the driver can include switches and an idle transistor that can be operated such that a low current path through the driver can exist when the driver is not coupled to a LED string.

The various examples are described in the context of LEDs, LED displays, and associated backlight circuitry. It should be appreciated that these examples are merely illustrative and the disclosed backlight circuit and methods described herein may be implemented in other contexts in which the benefits of the disclosure are desired (e.g., for illumination of keyboards, flash components, etc.). These benefits may include reduced mismatches of the drive current between LED strings, increased linearity when the backlight circuit is operated at high PWM frequencies, increased performance at low duty cycles and enhanced display image, as discussed in detail below.

As used throughout this specification, a reference number without an alpha character following the reference number can refer to one or more of the corresponding reference, the group of all references, or some of the references. For example, "220" can refer to any one of the strings 220 (e.g., string 220A, string 220B, etc.), can refer to all of the strings 220, or can refer to some of the strings (e.g., both string 220A and string 220B).

Exemplary Systems

Figure 1:
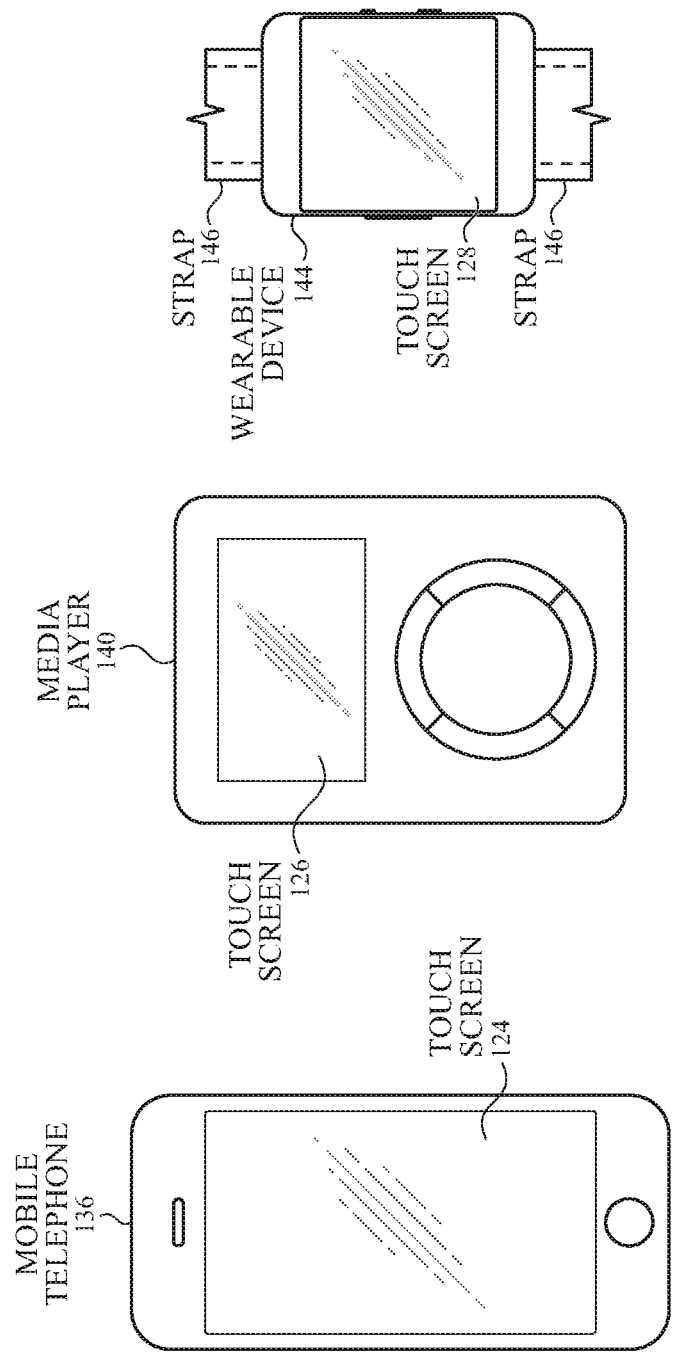
FIGS. 1A-1C illustrate systems in which examples of the disclosure can be implemented.

FIGS. 1A-1C illustrate systems in which examples of the disclosure can be implemented. FIG. 1A illustrates an exemplary mobile telephone 136 that can include a touch screen 124. FIG. 1B illustrates an exemplary media player 140 that can include a touch screen 126. FIG. 1C illustrates an exemplary wearable device 144 that can include a touch screen 128 and can be attached to a user using a strap 146.

Exemplary systems may also include other types of electronic devices such as computers, laptops, tablets, set-top boxes, wireless access points, televisions, and other electronic equipment that may include LEDs. For example, electronic devices may include LEDs in displays that may be used to present visual information and status data and/or may be used to gather user input data (e.g., keyboards, flash LEDs, and/or other components).

The touch screens 124, 126, and 128 can each include a display. A display may include an array of display pixels. Each display pixel may include one or more colored sub-pixels for displaying color images. Each display pixel may include a layer of liquid crystals disposed between a pair of electrodes to control the orientation of the liquid crystals. Controlling the orientation of the liquid crystals can control the polarization of the backlight generated by a backlight unit of the display (which can include the backlight circuit according to examples of the disclosure). This polarization control, in combination with polarizers on opposite sides of the liquid crystal layer, can allow the display to selectively block or selectively allow light at the display pixels.

The backlight unit may include one or more strings of LEDs and an associated backlight circuit that can generate the backlight for the display. The strings of LED(s) may be arranged along one or more edges of a light guide plate that distributes backlight generated by the strings to the LCD unit, or may be arranged to form a two-dimensional grid of LEDs. The backlight circuit can operate (e.g., control) the strings of LEDs.

Figure 2:
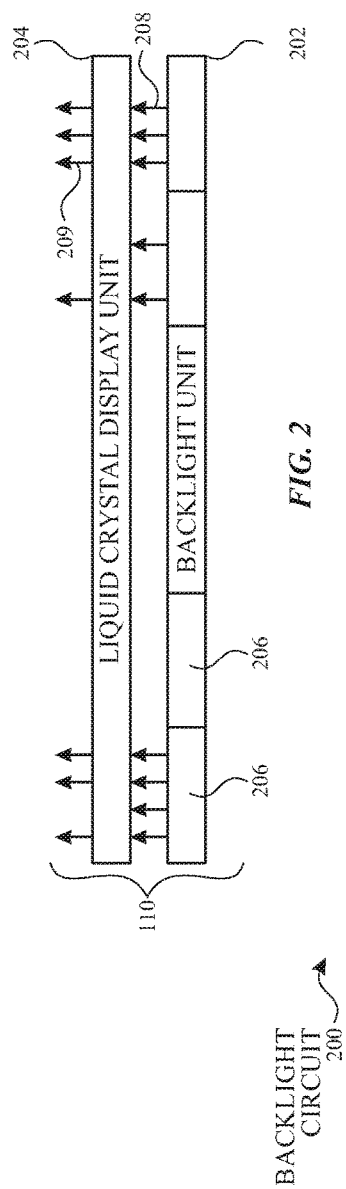
FIG. 2 illustrates a cross-sectional view of a portion of a display according to examples of the disclosure.

FIG. 2 illustrates a cross-sectional view of a portion of a display according to examples of the disclosure. The display 110 can include a backlight unit 202 and a liquid crystal display unit 204. The backlight unit 202 can generate backlight 208 that is emitted in the direction of the liquid crystal display unit 204. The liquid crystal display unit 204 can selectively allow some or all of the backlight 208 to pass through the display pixels therein to generate display light 209 visible to a user. The backlight unit 202 may include one or more subsections 206. In some implementations, the subsections 206 may be elongated subsections that extend horizontally or vertically across some or all of the display 110 (e.g., in an edge-lit configuration for the backlight unit 202). In other implementations, subsections 206 may be square or nearly square subsections (e.g., in a two-dimensional array backlight configuration). The subsections 206 may include one or more strings of LEDs. In some examples, the subsections 206 may be controlled individually for local dimming of backlight 208.

Exemplary Multi-String LED Drivers

Figure 3:
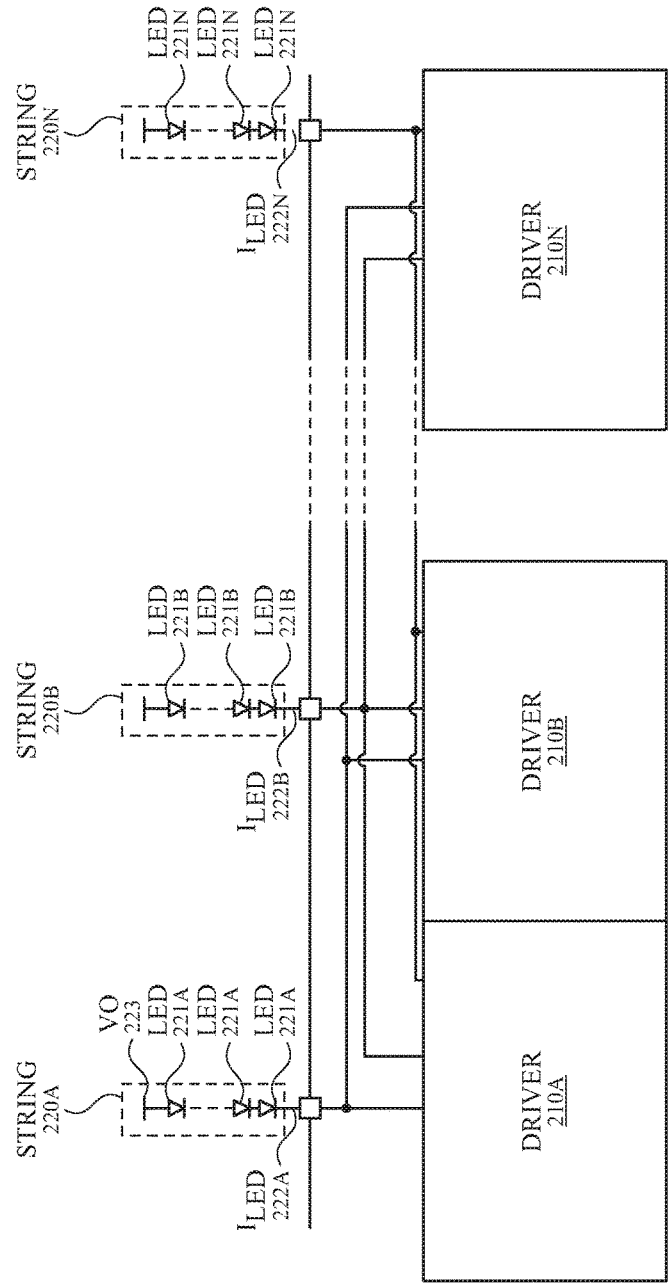
FIG. 3 illustrates a block diagram of a portion of an exemplary backlight circuit including multi-string LED drivers according to examples of the disclosure.

FIG. 3 illustrates a block diagram of a portion of an exemplary backlight circuit including multi-string LED drivers according to examples of the disclosure. Backlight circuit 200 can be implemented in the backlight unit 202 shown in FIG. 2, for example. The backlight circuit 200 can include a set of strings 220 and a set of drivers 210. As used herein, a set of elements (e.g., strings, drivers, transistors) can include one or more elements.

The set of strings 220 can each include one or more LEDs 221 connected in series. For example, the string 220A can include a set of LEDs 221A connected in series; the string 220B can include a set of LEDs 221B connected in series; and the string 220N can include a set of LEDs 221N connected in series. In some examples, the variable "N" can refer to the total number of strings 220 in the backlight circuit 200.

The LEDs 221 can receive a voltage $V_O$ 223 at a first end of a string from, for example, a DC/DC converter (not shown). In some examples, boost regulators may generate the high voltage for the strings 220 and allow drivers 210 to have sufficient headroom. The LEDs 221 can also be coupled, at a second end of the string 220, in series with a driver 210. Exemplary drivers 210 are discussed in more detail below.

As previously mentioned, any driver 210 can be coupled to any string 220. In some examples, the order of which a driver 210 is connected to a given string 220 can be changed. The change in order can reduce current mismatches among the set of strings 220. In some examples, the current mismatch can be the difference between drive currents $I_{LED}$ 222 among the set of strings (e.g., the difference between $I_{LED}$ 222A and $I_{LED}$ 222B).

Although not shown in the figure, examples of the disclosure can further include circuitry that allows the strings 220 to couple to some or all (e.g., each) of the set of drivers 210. Exemplary circuitry can include a set of switches. The switches may be included in the drivers 210, or may be a component separate from the drivers 210. For example, the driver 210A can include five switches, each configured to couple a unique string for the driver 210A to receive one or more of the drive currents (e.g., $I_{LED}$ 222A, $I_{LED}$ 222B, $I_{LED}$ 222C, $I_{LED}$ 222D, $I_{LED}$ 222E).

Using multi-string LEDs in a display backlight may be beneficial for certain technologies based on its rated voltage, efficiency, and drive current regulation. A configuration where each string 220 to be coupled to a unique driver 210 can lead to increased power consumption. Additionally, using multiple strings 220 can lead to higher complexity or reduced image quality due to drive current mismatches between the strings 220. The current mismatches can be due to, e.g., mismatches in the components (e.g., transistors, resistors, etc.) of the different drivers and mismatches in the offsets of the amplifiers in the drivers (not shown).

Exemplary Operations of Multi-String LED Drivers

Figure 4A:
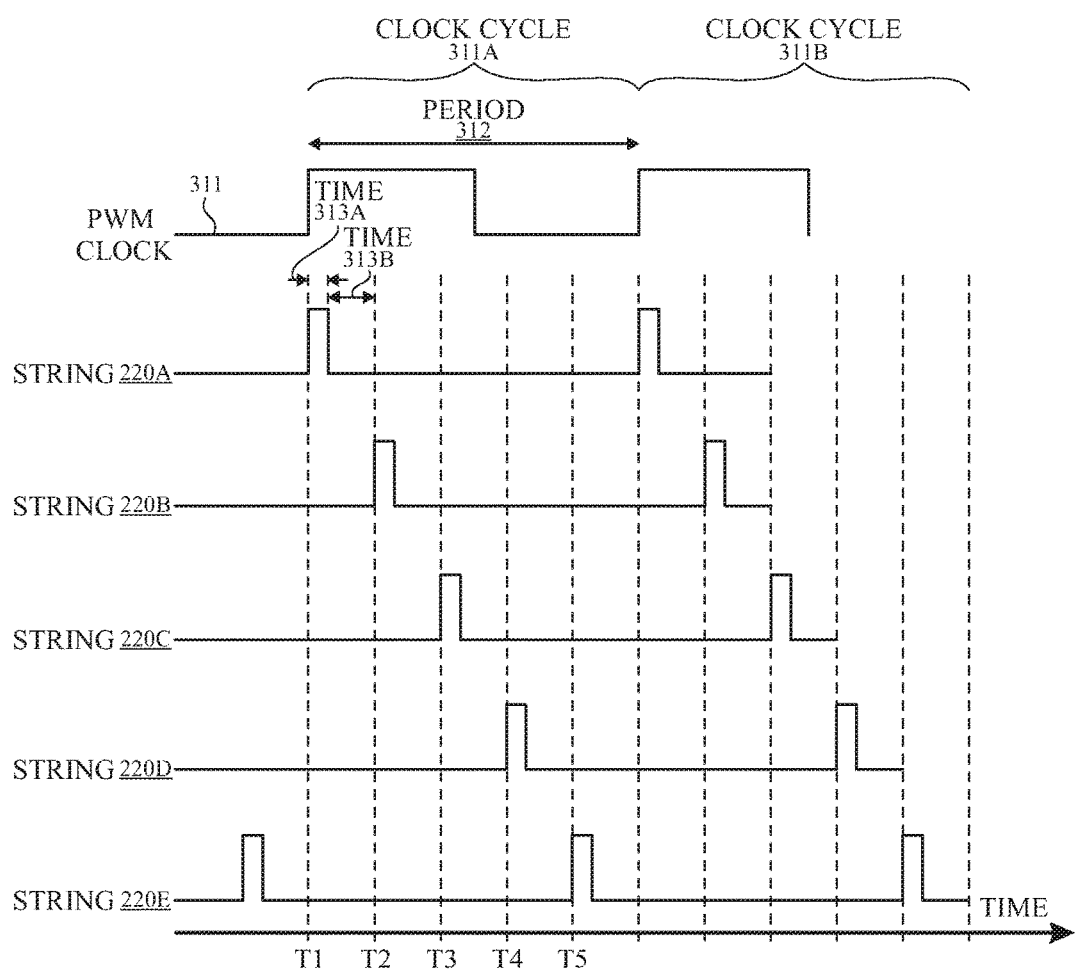
FIGS. 4A-4F illustrate timing diagrams of exemplary operations of multi-string LED drivers according to examples of the disclosure.
Figure 4B:
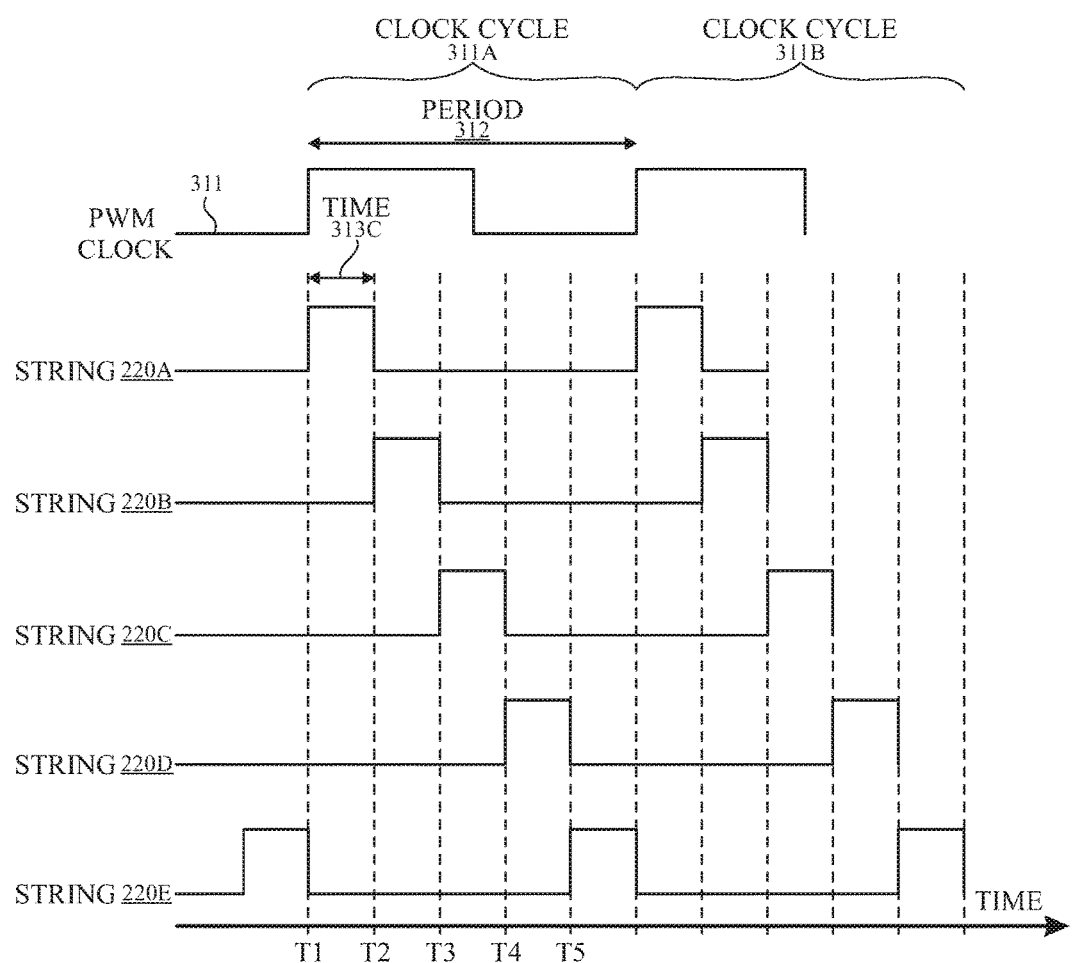
Figure 4C:
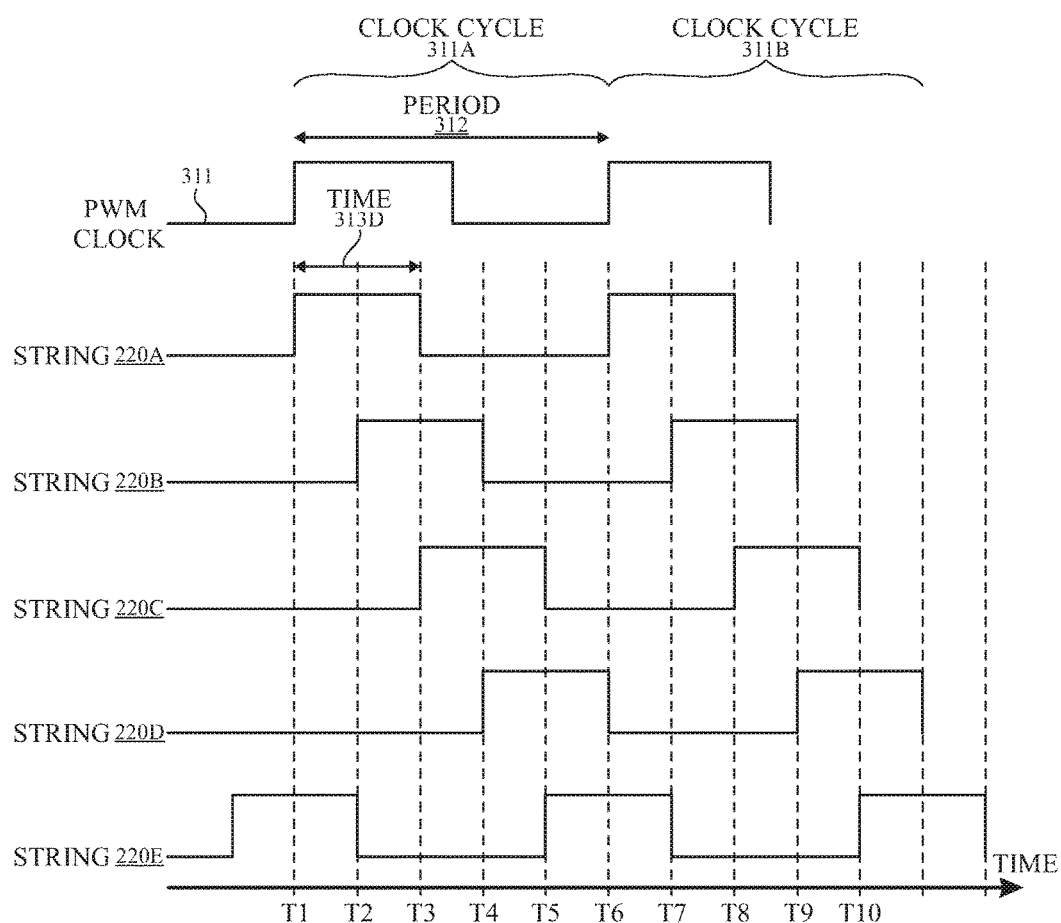
Figure 4D:
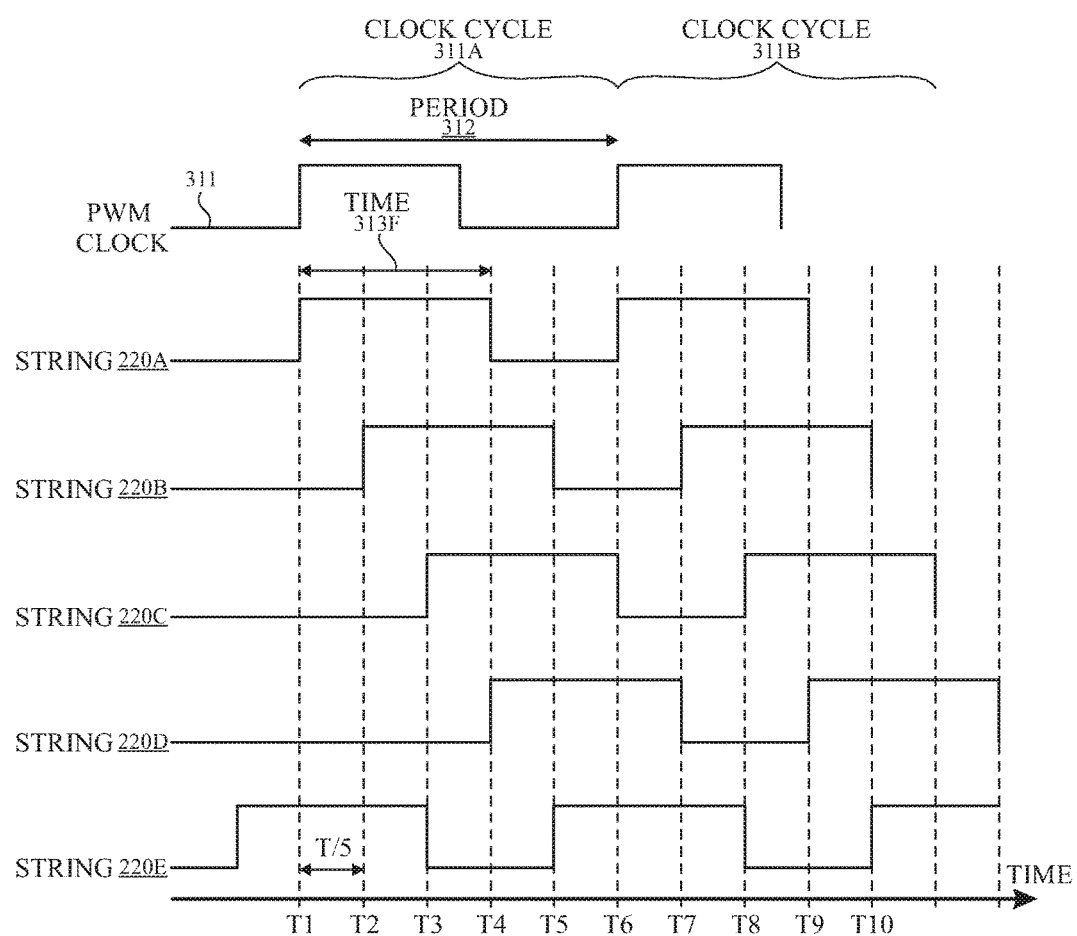
Figure 4E:
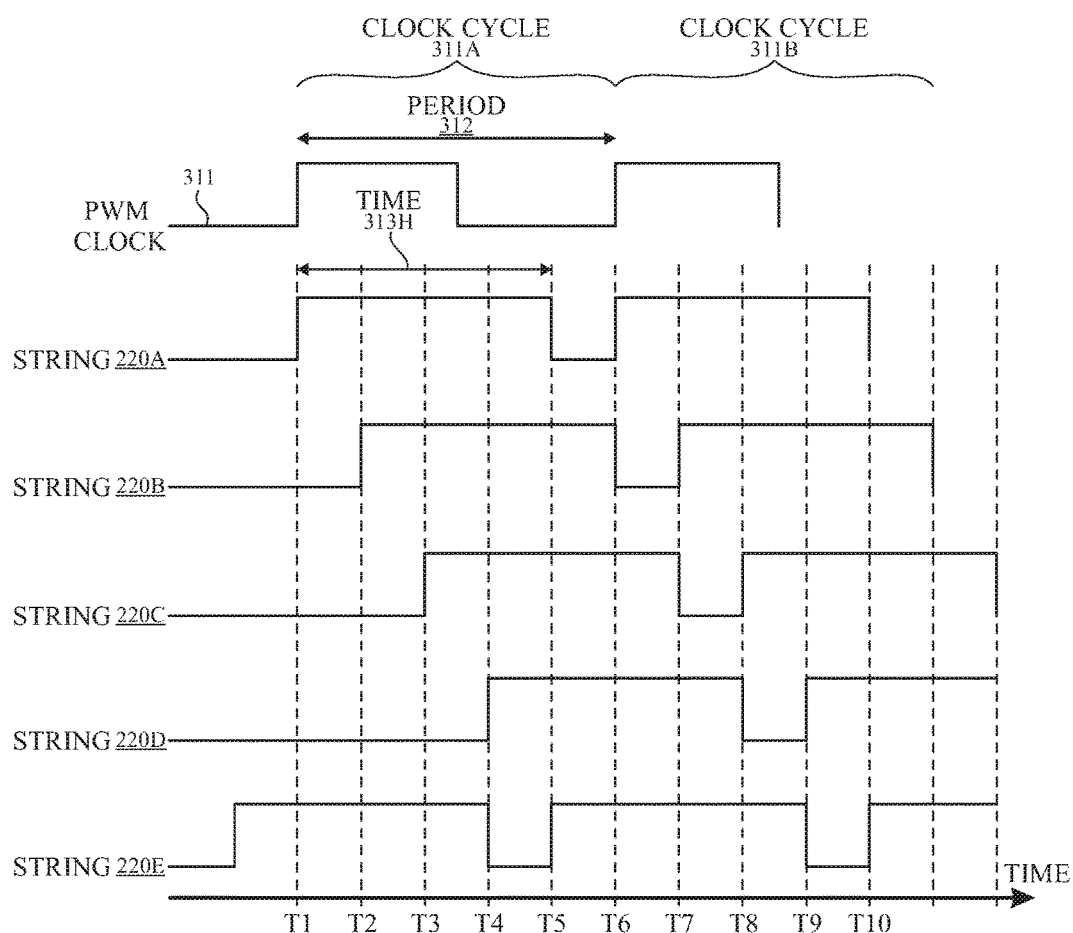
Figure 4F:
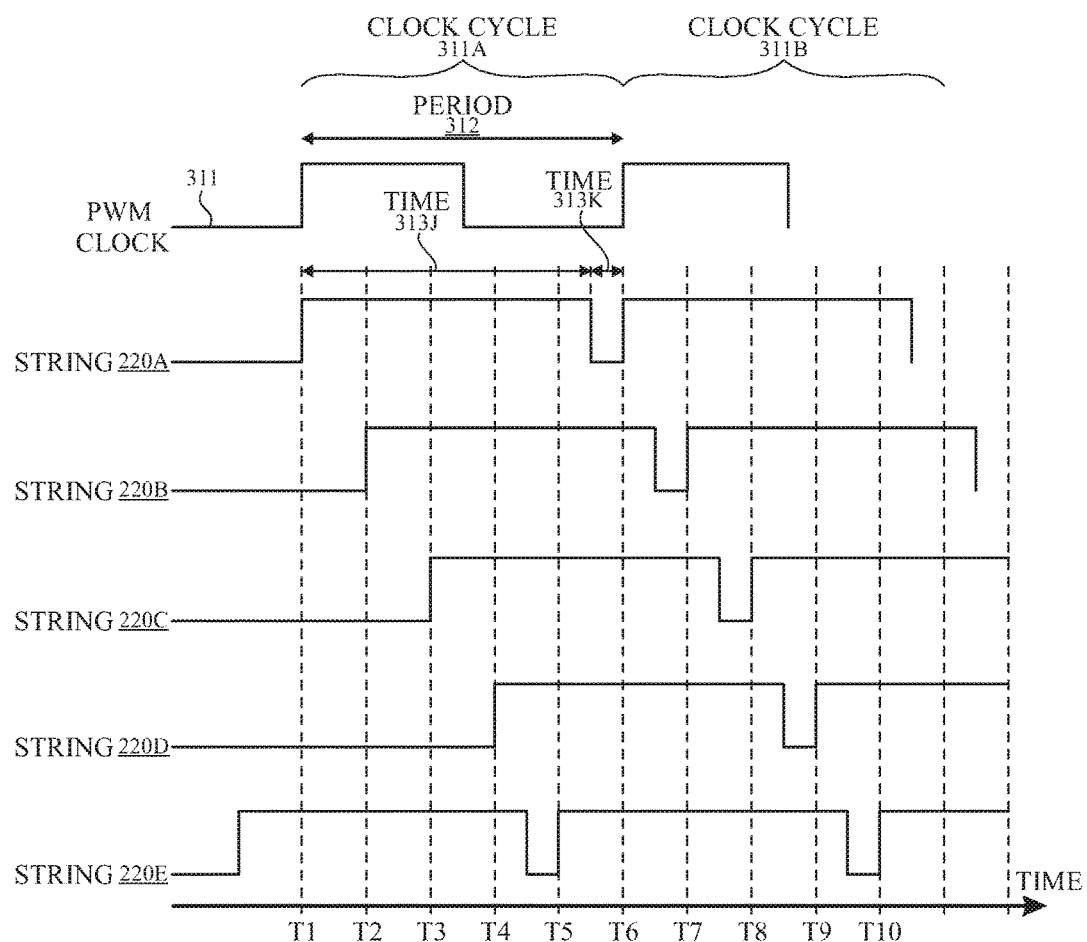
Figure 4G:
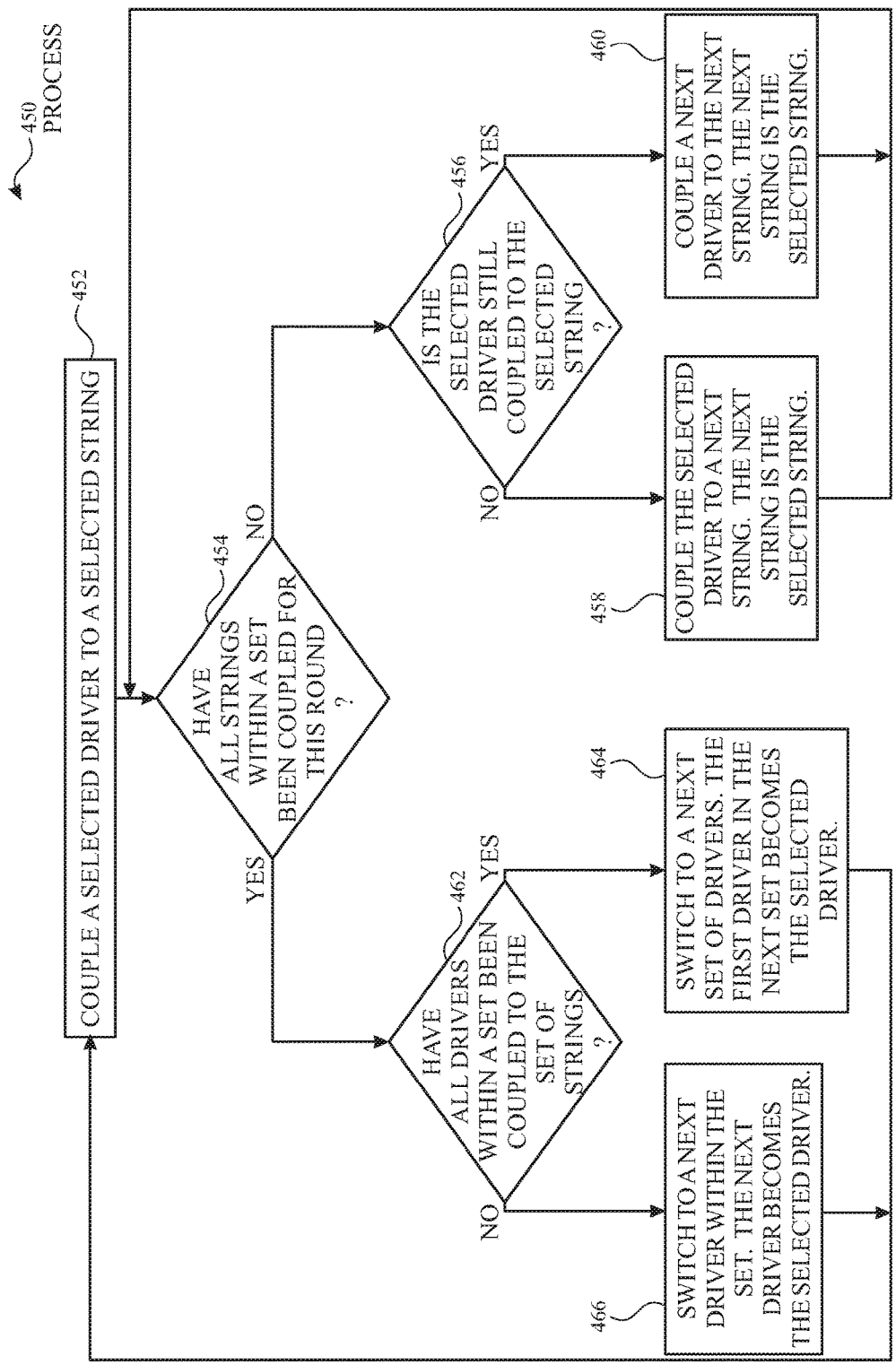
FIG. 4G illustrates a process flow of an exemplary operation of multi-string LED drivers according to examples of the disclosure.

FIGS. 4A-4F illustrate timing diagrams of exemplary operations, and FIG. 4G illustrates a process flow of an exemplary operation of multi-string LED drivers, according to examples of the disclosure. The backlight circuit 200 can be operated based on a number of factors, such as the period of the PWM clock cycle, the duty cycle of the drive current, and the number of strings 220 in a set of strings. In some examples, the operation of the backlight circuit 200 may change while the display is being operated in real-time.

As discussed above, the brightness of a display can be adjusted by changing the duty cycle of the drive current. The duty cycle can be related to the length of time of the on pulses of the drive current relative to its period. For example, a larger duty cycle can be associated with a wider pulse.

With a set of drivers 210 capable of coupling to different strings 220, the backlight circuit 200 can utilize a single driver or less than all of the set of drivers 210 to control some or all of the strings 220. The number of drivers 210 activated (e.g., actively controlling one or more strings 220) may depend on the period 312 of the PWM clock, the width of the pulse of the drive current $I_{LED}$ 222, and the number of strings 220. In some examples, the period 312 of the PWM clock can be equal to the duration of a display frame.

Examples of the disclosure can include using all or less than all of the backlight circuit 200 in the backlight circuit 200. The drivers used to control the strings 220 within a given clock cycle can be referred to as a set of drivers. Examples of the disclosure can also include using all or less than all of the strings 220. The strings that are controlled by the drivers within a given clock cycle can be referred to as a set of strings.

In some examples, a single driver 210 can be used to control a set of strings 220. FIG. 4A illustrates a timing diagram of an exemplary operation of a set of strings controlled by a single driver. The PWM clock 311 can have a period 312. The strings 220 can be turned on (e.g., coupled to and actively controlled by one or more drivers 210), one at a time, and in a manner such that all of the strings 220 are turned on once before any string is turned on a second time (i.e., a round). In some examples, the strings 220 can be turned on and turned off (e.g., not coupled to and not being actively controlled by a driver 210) sequentially such that one string (e.g., string 220A) is turned on and turned off before another string (e.g., string 220B) is turned on. For example, the string 220A can be turned on at time T1 for a duration of time 313A; the string 220B can be turned on at time T2 for a duration of time 313A; the string 220C can be turned on at time T3 for a duration of time 313A; the string 220D can be turned on at time T4 for a duration of time 313A; and the string 220E can be turned on at time T5 for a duration of time 313A.

The period 312 can be divided into a set of time intervals, which are five time intervals in the example of FIG. 4A. A string 220 can be turned on at every time interval: T1, T2, T3, T4, and T5. In some examples, the time 313A can be such that the same first string 220 is turned on before a second string 220 is turned on. That is, the time 313A can be less than the time between adjacent time intervals (e.g., time 313A is less than the difference between T2 and T1). In other words, the time 313A can be such that it is less than the period 312 divided by the number of strings 220 (e.g., five strings). The time 313A and the number of strings 220 can be such that all of the set of strings 220 can be turned on and turned off within the period 312. As a result, a single driver (e.g., only driver 210A illustrated in FIG. 3) can be used to control a set of strings 220 of the display.

Using a single driver 210 to control a set of strings 220 can be beneficial for certain applications, such as low brightness applications. When multiple drivers are used in low brightness applications, a current mismatch can exist between different strings 220. This current mismatch can lead to unwanted effects such as different rise and fall times, mismatches and corresponding linearity differences between different digital-to-analog converters (DACs), driver offsets, and other errors. As such, the use of a single driver 210 for low brightness application can help reduce these mismatches and linearity differences.

With the time 313A being less than the period 312 divided by the number of strings, another time 313B can exist between two strings 220 being operated by the same driver 210. In some examples, during this time, the driver 210 may not be biased (i.e., turned off) until a subsequent string is being controlled (e.g., after time 313B has lapsed). In some examples, during this time, the driver 210 may maintain its bias point by operating in an idle state, but the driver may not be coupled (e.g., controlling) to a string 220; more details about the idle state operation of a driver is described below.

In some examples, although a single driver 210 may be used throughout a given clock cycle 311, the backlight circuit 200 may change to use different drivers 210 (e.g., a different set of drivers). For example, the driver 210A can be used for the clock cycle 311A; the driver 210B can be used for the clock cycle 311B; etc. As a result, mismatches (e.g., due to different drive currents $I_{LED}$ 222) can be reduced when their values are averaged over time.

FIG. 4B illustrates a timing diagram of an exemplary operation of set of strings being controlled by a single driver. In some examples, the operation shown in FIG. 4B can be similar to that shown in FIG. 4A, but the time that a string is on may be longer (e.g., time 313C is greater than time 313A). The PWM clock 311 can have a period 312, which can be divided into a set of time intervals (T1, T2, T3, T4, and T5).

Similar to the operation of FIG. 4A, the strings 220 can be turned on, one at a time, and all of the strings 220 can be turned on a first time before any string is turned on a second time. In some examples, the strings 220 can be turned on and turned off sequentially such that one string (e.g., string 220A) is turned on and turned off before another string (e.g., string 220B) is turned on. Additionally, a string 220 can be turned on at every time interval. For example, the string 220A can be turned on at time T1 for a duration of time 313C; the string 220B can be turned on at time T2 for a duration of time 313C; the string 220C can be turned on at time T3 for a duration of time 313C; the string 220D can be turned on at time T4 for a duration of time 313C; and the string 220E can be turned on at time T5 for a duration of time 313C.

The time 313C can be such that a first string 220 can be turned off before a second string 220 is turned on. In some examples, the time 313C can be equal to a time interval (e.g., the difference between T2 and T1). In this operation, the time 313C can be such that it is equal to the period 312 divided by the number of strings 220 (e.g., five strings). The time 313C and the number of strings 220 can be such that all of the set of strings 220 can be turned on and turned off within the period 312. As a result, a single driver (e.g., only driver 210A illustrated in FIG. 3) can be used to control a set of strings 220 of the display. The time 313C may be different (e.g., longer) from the time 313A of FIG. 4A, and as such, there may not be an off time (e.g., time 313B of FIG. 4A) for the driver 210 as it switches between strings 220. The "off time" for a driver 210 may refer to the driver being in an off state where it does not operating at all or is operating in an idle mode, as discussed below. In some instances, a driver 210 may remain on for the entire duration of the period 312 and may be coupled to a different string 220 for different time intervals of the period 312. For example, the string 220B can be turned on immediately after the string 220A is turned off while the driver 210A remains on.

In some examples, similar to as discussed above with FIG. 4A, the backlight circuit 200 may change between multiple drivers 210 for, e.g., different clock cycles. For example, the driver 210A can be turned on for the clock cycle 311A; the driver 210B can be turned on for the clock cycle 311B; etc. Additionally, like FIG. 4A, a single driver 210 can be used to control a set of strings 220, and the benefits can be correspondingly similar. For example, mismatches (e.g., due to different drive currents $I_{LED}$ 222) can be reduced when their values are averaged over time.

In some examples, the strings 220 may be not be controlled sequentially. FIG. 4C illustrates a timing diagram of a set of strings 220 controlled by a set of drivers 210. The PWM clock 311 can have a period 312, which can be divided into a set of time intervals (T1, T2, T3, T4, and T5). The strings 220 can be turned on, one at a time, where a string can be turned on at every time interval. For example, the string 220A can be turned on at time T1 for a duration of time 313D; the string 220B can be turned on at time T2 for a duration of time 313D; the string 220C can be turned on at time T3 for a duration of time 313D; the string 220D can be turned on at time T4 for a duration of time 313D; and the string 220E can be turned on at time T5 for a duration of time 313D.

The time 313D can be greater than a time interval (e.g., the difference between T2 and T1). In some instances, the time 313D can be equal to the duration of two time intervals (e.g., the difference between T3 and T1). In this operation, the time 313D can be such that it is greater than the two times the period 312 divided by the number of strings in a set of strings (e.g., five strings). In some examples, the time 313D can also be less than three times the period 312 divided by the number of strings in a set of strings.

In some instances, the time 313D may not allow all of the strings 220 to be turned on, one at a time, and then also turned off during a single clock cycle 311. As one way to reduce the total time for controlling a set of strings 220, in some examples, a string can be turned on, while another string is already on. For example, at time T2, the string 220A may already be on (e.g., coupled to a driver), while the string 220B is turned on. In some examples, the minimum number of drivers 210 needed to activate the strings for a given clock cycle 311 can be equal to the number of time intervals that the time 313D is equal to. In this example, the minimum number of drivers 210 needed may be two.

Examples of the disclosure can include using different drivers 210 to control a set of strings 220. As one example, a first driver (e.g., driver 210A) can be used to control the string 220A, the string 220C, and the string 220E. In this manner, there may not be an off time for the driver 210A as it switches between strings 220. Additionally, a second driver (e.g., driver 210B) can be used to control the string 220B and the string 220D. In some instances, there may not be an off time for the driver 210B as it switches between strings 220. As such, two drivers 210 can be used to control the strings 220 for a given clock cycle 311.

In some examples, similar to as discussed above with FIG. 4A, the backlight circuit may change between multiple drivers 210 for, e.g., different clock cycles. In the previous example, discussed immediately above, the drivers 210A and 210B can be used for the clock cycle 311A. In clock cycle 311B, different drivers, e.g., the drivers 210C and 210D, can be used.

In other examples, more than two drivers 210 can be used to control a set of strings 220 for a given clock cycle 311. For example, the driver 210A can be used to control the string 220A and the string 220D; the driver 210B can be used to control the string 220B and the string 220E; and the driver 210C can be used to control the string 220C. In this manner, there may be an off time for the drivers 210.

Additionally, examples of the disclosure can include repeating the use of a set of drivers. For example, at a third clock cycle (not shown), the same set of drivers from the first clock cycle 311A can be used. Similarly, at a fourth clock cycle (not shown), the same set of drivers from the second clock cycle 311B can be used, etc.

As another example, only the minimum number of drivers needed may be used. In the example of FIG. 4C, a minimum of two drivers 210 is needed, as discussed above. In such instances, the same two drivers can be used to turn on and turn off the strings, which can reduce current mismatches when their values are averaged over time.

FIG. 4D illustrates a timing diagram of an exemplary operation of a set of strings controlled by a set of drivers. In some examples, the operation shown in FIG. 4D can be similar to that shown in FIG. 4C, but the time that a string is on may be longer (e.g., time 313F is greater than time 313D). The PWM clock 311 can have a period 312, which can be divided into a set of time intervals (T1, T2, T3, T4, and T5).

Similar to the operation of FIG. 4C, the strings 220 can be turned on, one at a time, where a string can be turned on at every time interval. Referring back to FIG. 4D, the duration of which a string can be controlled by a driver 210 can be time 313F. The time 313F can be greater than a time interval (e.g., the difference between T2 and T1). In some instances, the time 313F can be equal to the duration of three time intervals (e.g., the difference between T4 and T1).

In this operation, the time 313F can be such that it is greater than three times the period 312 divided by the number of strings 220 in a set of strings (e.g., five strings). In some examples, the time 313F may also be less than four times the period 312 divided by the number of strings.

In some instances, the time 313F may not allow all of the strings 220 in a set of strings to be turned on, one at a time, and then also turned off during a single clock cycle 311. As one way to reduce the total time for controlling a set of strings 220, in some examples, a string can be turned on, while multiple strings are already on. For example, at time T3, the strings 220A and 220B may be on (e.g., coupled to a driver), while the string 220C is turned on. In some examples, the minimum number of drivers 210 needed to activate the set of strings for a given clock cycle 311 can be equal to the number of time intervals that the time 313F is equal to. In this example, the minimum number of drivers 210 needed may be three.

Examples of the disclosure can include using different drivers 210 to control a set of strings 220. As one example, a first driver (e.g., driver 210A) can be used to control the string 220A and the string 220D. In this manner, there may not be an off time for the driver 210A as it switches between strings 220. Additionally, a second driver (e.g., driver 210B) can be used to control the string 220B and the string 220E. In some instances, there may not be an off time for the driver 210B as it switches between strings 220. Further, a third driver (e.g., driver 210C) can be used to control the string 220C. In this example, three drivers 210 are used to control the set of strings 220 for a given clock cycle 311.

In some examples, similar to as discussed above with FIG. 4A, the backlight circuit may change between multiple drivers 210 for, e.g., different clock cycles. In the previous example, discussed immediately above, the drivers 210A, 210B, and 210C can be used for the clock cycle 311A. In clock cycle 311B, different drivers, e.g., the drivers 210D and 210E, can be used.

In other examples, more than three drivers 210 can be used to control a set of strings 220 for a given clock cycle 311. For example, the driver 210A can be used to control the string 220A and the string 220E; the driver 210B can be used to control the string 220B; the driver 210C can be used to control the string 220C; and the driver 210D can be used to control the string 220D. In this manner, there may be an off time for the drivers 210.

Additionally, examples of the disclosure can include repeating the use of a set of drivers. For example, at a third clock cycle (not shown), the same set of drivers from the first clock cycle 311A can be used. Similarly, at a fourth clock cycle (not shown), the same set of drivers from the second clock cycle 311B can be used, etc.

As another example, only the minimum number of drivers needed may be used. In the example of FIG. 4D, a minimum of three drivers 210 is needed, as discussed above. In such instances, the same set of three drivers can be used to turn on and turn off the strings, which can reduce current mismatches when their values are averaged over time.

FIG. 4E illustrates a timing diagram of an exemplary operation of a set of strings being controlled by a set of drivers. In some examples, the operation shown in FIG. 4E can be similar to that shown in FIG. 4D, but the time that a string is on may be greater (e.g., time 313H is greater than time 313F). The PWM clock 311 can have a period 312, which can be divided into a set of time intervals (T1, T2, T3, T4, and T5).

The strings 220 can be turned on, one at a time, where a string can be turned on at every time interval. For example, the string 220A can be turned on at time T1 for a duration of time 313H; the string 220B can be turned on at time T2 for a duration of time 313H; the string 220C can be turned on at time T3 for a duration of time 313H; the string 220D can be turned on at time T4 for a duration of time 313H; and the string 220E can be turned on at time T5 for a duration of time 313H.

The time 313H can be greater than a time interval (e.g., the difference between T2 and T1). In some instances, the time 313H can be equal to the duration of four time intervals (e.g., the difference between T5 and T1). In this operation, the time 313H can be such that it is greater than four times the period 312 divided by the number of strings in a set. Similar to FIG. 2E, a string can be turned on, while multiple strings are already on. In some examples, the minimum number of drivers 210 needed to activate the set of strings for a given clock cycle 311 can be equal to the number of time intervals that the time 313H is equal to. In this example, the minimum number of drivers 210 needed may be four.

Examples of the disclosure can include using different drivers 210 to control a set of strings 220. As one example, a first driver (e.g., driver 210A) can be used to control the string 220A; a second driver (e.g., driver 210B) can be used to control the string 220B; a third driver (e.g., driver 210C) can be used to control the string 220C; a fourth driver (e.g., driver 210D) can be used to control the string 220D; and a fifth driver (e.g., driver 210E) can be used to control the string 220E. In some examples, similar to as discussed above, a given string may be controlled by a different set of drivers for different clock cycles, which can reduce current mismatches for that string when their values are averaged over time. For example, the string 220A can be controlled by the driver 210A during the clock cycle 311A, but may be controlled by the driver 210B during the clock cycle 311B.

In some examples, only the minimum number of drivers needed may be used. In the example of FIG. 4E, a minimum of four drivers 210 is needed, as discussed above. In such instances, the same set of four drivers can be used to turn on and turn off the strings, which can reduce current mismatches when their values are averaged over time.

In some instances, the time that a string 220 is turned off may be less than the duration of a time interval. As shown in FIG. 4F, the time 313J may represent the duration that a string 220 is on, and the time 313K may representation the duration that a string is off. The time 313K may be less than the duration of a time interval (e.g., difference between T2 and T1). In such instances, the minimum number of drivers needed to control the set of strings 220 can be equal to the number of strings in the set, which can be five drivers 210 and five strings 220 in the example of FIG. 4F. Example of the disclosure can include changing the driver 210 used to control a given string 220, changing the order of the drivers 210 activating the strings, etc., as discussed above.

FIG. 4G illustrates a corresponding exemplary process. The process 450 can begin with step 452, where a selected driver can be coupled a selected string. For example, as described in FIGS. 4A-4F, driver 210A is the selected driver that controls a first string 220A, the selected string, at time T1. At step 454, a determination of whether all of the strings within a set have been coupled for a given round. If so, the process 450 can proceed with changing the selected driver in step 462.

If not, the process 450 can proceed controlling the remaining strings within the set with step 456. In step 456, at the next time interval, a determination is made as to whether the selected driver is still coupled to the selected string. The selected driver may still be coupled to the selected string if the selected driver is still controlling the selected string. For example, at time T2 of FIG. 4C, the driver 210A may still be coupled to the string 220A. If the selected driver is not coupled to the selected string, then the same selected driver can be coupled to the next string (step 458 of process 450). For example, at time T2 of FIG. 4B, the driver 210A may not be coupled to the selected string 220A, so the driver 210A may be coupled to the next string, string 220B.

If the selected driver is coupled to the selected string, then the next driver can be coupled to the next string (step 460 of process 450). FIG. 4D illustrates such an example. At time T2, the selected driver may be driver 210A coupled to the selected string 220A. The next driver may be the driver 210B, which can be coupled to the next string 220B.

The process 450 proceeds to step 462 when a round of controlling all strings within a set of strings has been completed. As an example, in FIG. 4A, a first round can include controlling all of the strings 220A-220E during the clock cycle 311A using driver 210A. The second round can occur during the clock cycle 311B, where the driver 210B can be used to control the set of strings.

In step 462, a determination is made as to whether all of the drivers within a set have been coupled to the set of strings. If so, then the process 450 repeats with the next set of drivers switched in step 464. Step 464 is shown with the example of FIG. 4C, where at clock cycle 311B, drivers 210C and 210D can be used, instead of drivers 210A and 210B (used in clock cycle 311A).

If not all drivers within a set have been coupled to the set of strings, then in step 466, the process continues with the next driver within the same set.

Exemplary Driver

Figure 5A:
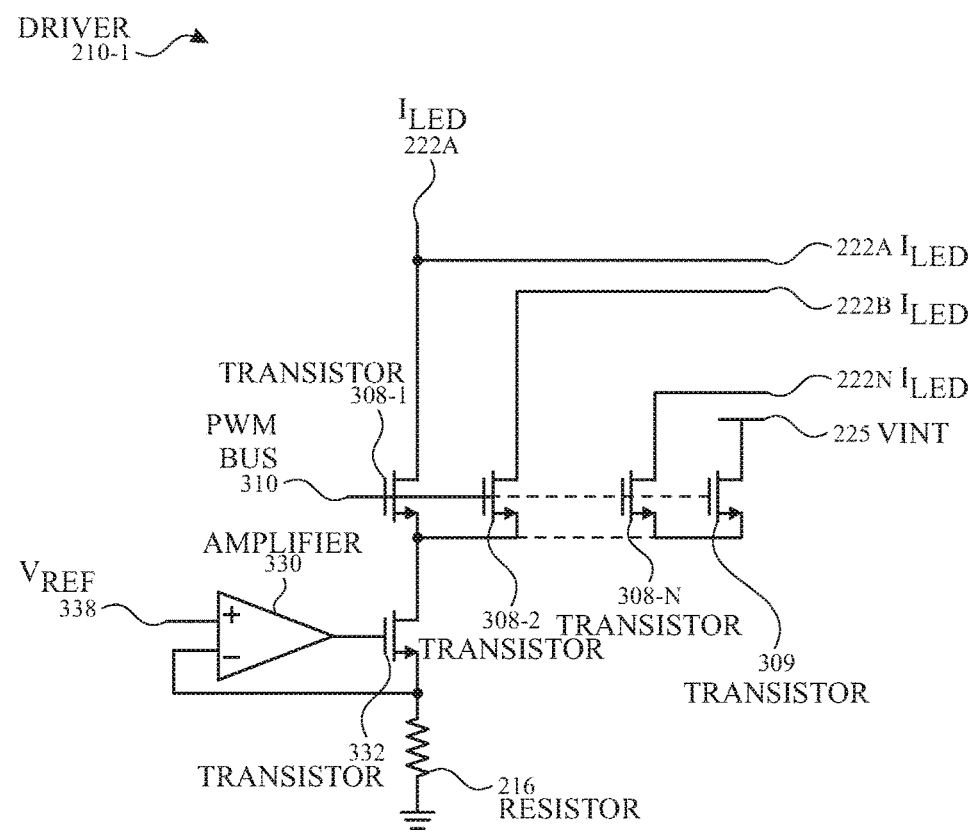
FIG. 5A illustrates a schematic diagram of an exemplary driver including an auxiliary transistor according to examples of the disclosure.

A driver 210 can include a set of circuit components. One exemplary driver is shown in the schematic diagram of FIG. 5A. The driver 210-1 can be coupled to a string 220 and can receive a voltage signal $V_{REF}$ 338, a PWM bus 310, and drive currents $I_{LED}$ 222 as inputs. In some examples, each driver 210 can receive a unique signal from the PWM bus 310 that the other drivers 210 may not receive. In some examples, the PWM bus 310 can include individual signals. The individual signals may be coupled to a unique transistor 308 to turn it on. In some examples, the PWM bus signals can be generated by inputting a PWM signal having a duty cycle to a decoder (not shown) coupled to all of the transistors 308; at a given time, the PWM signal can drive the decoded output. In some examples, the PWM bus 310 can include one PWM signal that drives a gate of one transistor 308. In these examples, the strings 220 can couple to the inputs of a multiplexer (not shown), and an output of the multiplexer can couple to a source or drain of the one transistor 308. The multiplexer can be controlled to selectively couple a selected string to the transistor 308. The driver 210-1 can include a set of transistors 308 and transistor 332 (e.g., field effect transistors such as metal oxide semiconductor field effect transistors (MOSFETs)) that can control the drive current $I_{LED}$ 222. Although the driver 210 is illustrated as including transistors, it is understood that switching elements other than transistors can also be used.

The transistor 308 can be a PWM-controlled transistor having a first source/drain terminal coupled to a string 220, a gate terminal capable of receiving a signal from the PWM bus 310, and a second source/source terminal. The transistor 308 can be coupled to a PWM signal source or sources (not shown) that provides the signals of the PWM bus 310, to control the drive current $I_{LED}$ 222 through a string 220 by reducing the total charge allowed according to the duty cycle of a PWM bus 310.

The transistor 332 can be a current regulation transistor having a first source/drain terminal coupled to the second source/drain terminal of the transistor 308, a gate terminal coupled to an output of an amplifier 330, and a second source/drain terminal coupled to ground through a resistor 216. In some examples, the resistor 216 can determine the gain (e.g., transconductance) of the driver 210. The transistor 332, in combination with a source that supplies a reference voltage $V_{REF}$ 338 and the operational amplifier 330, can form a current regulation controller for the LEDs 221 to control the drive current $I_{LED}$ 222 through a string 220.

In this manner, the driver 210 can include a cascade of two switching devices to control the drive current $I_{LED}$ 222, one configured for current regulation (for analog dimming) and the other implemented as a switch for PWM pulse-width current control (for PWM dimming).

The signals of the PWM bus 310 can include alternating on pulses and off pulses. The width (e.g., the length of time of an on pulse) of the pulses can be used to control the duty cycle of the drive current through the LEDs 221 to, for example, causing dimming of the LEDs 221 without changing the voltage $V_O$ 223 or $V_{REF}$ 338. In some examples, the operational amplifier 330 may be used to help reduce or prevent voltage spikes at the gate terminal at or near the rising edge of a signal of the PWM bus 310 (e.g., when transistor 332 turns on). During the off pulses, the transistor 308 can be off, so there may be substantially no current flowing in the LEDs 221.

Exemplary Driver with an Auxiliary Transistor

In some examples, the driver can also include an auxiliary transistor 309. The transistor 309 can be coupled to a voltage source $V_{INT}$ 225. In some examples, each driver 210 can include a unique voltage source $V_{INT}$ 225 that may not be connected to any other driver 210. The transistor 309 can be enabled for a short period of time to allow the driver 210 to settle (e.g., reach and stabilize) before being switched to control the respective string 220. In some examples, the transistor 309 turns on before a signal of the PWM bus 310 turns on (e.g., a signal controlling the transistor 309 (not shown) is an inverted version of the PWM signals). In this manner, the transistor 309 can be enabled before the respective string is coupled to the driver 210-1, thereby leading to reduced rise and fall times for the drive current $I_{LED}$ 222 through a given string 220.

Figure 5B:
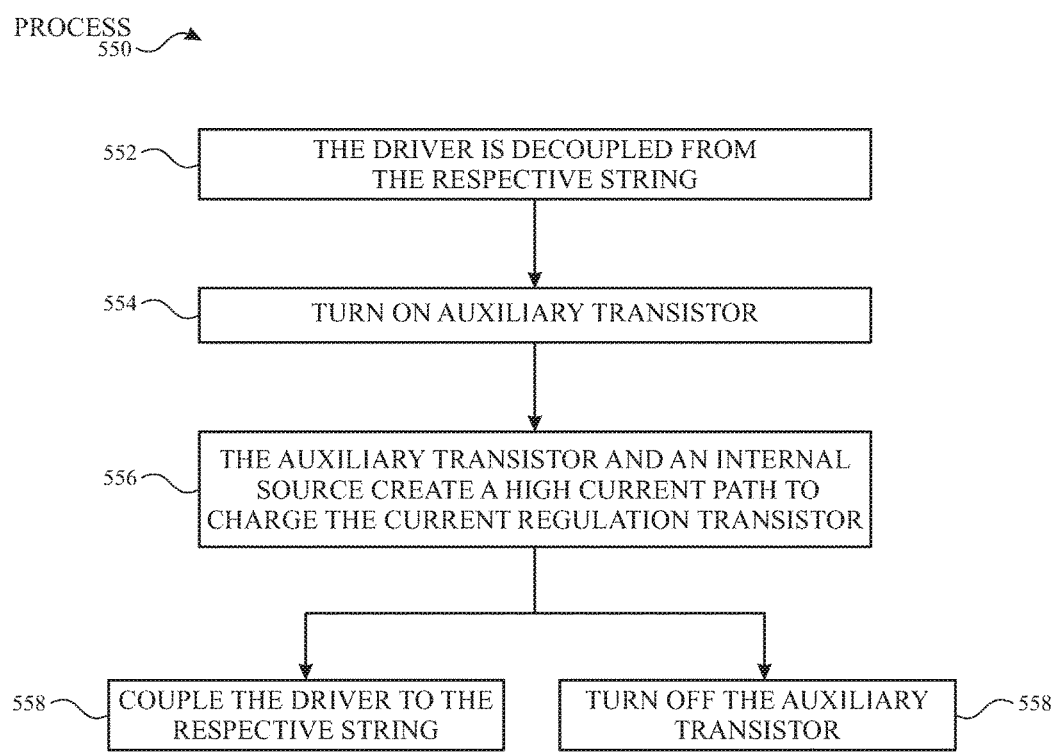
FIG. 5B illustrates a process flow of an exemplary operation of a driver including an auxiliary transistor according to examples of the disclosure.
Figure 5C:
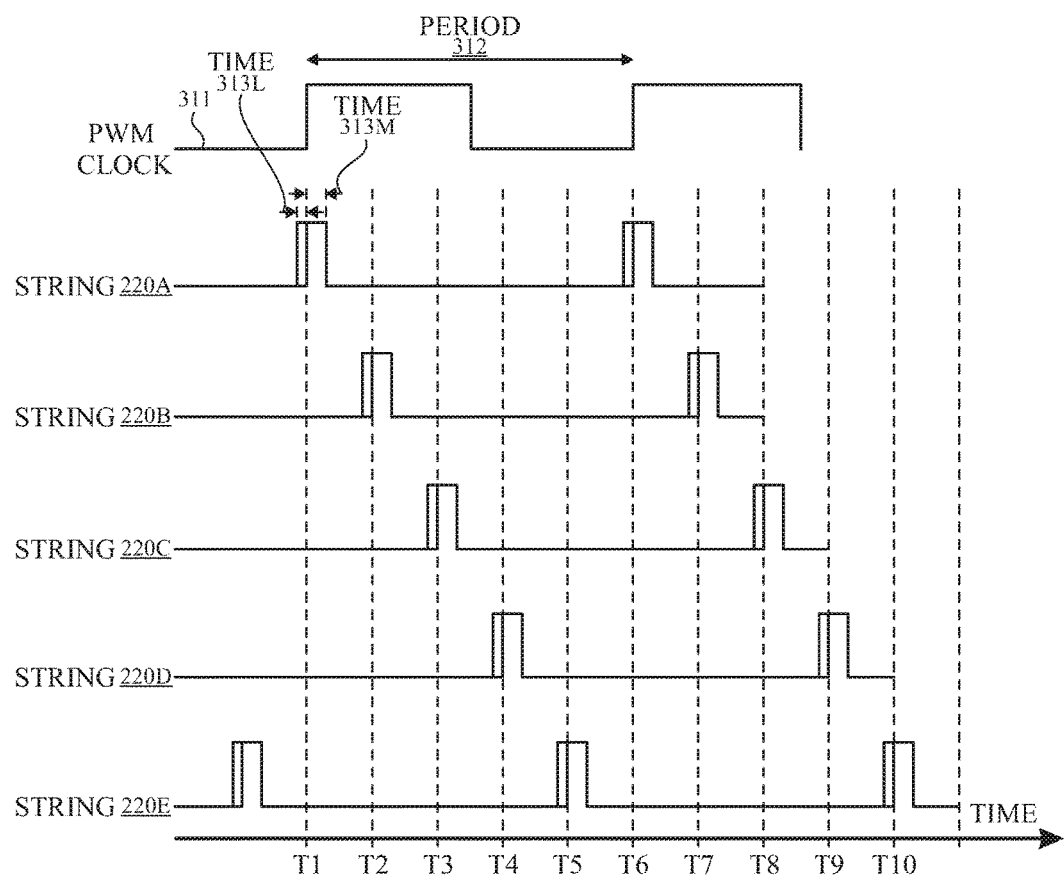
FIG. 5C illustrates a timing diagram of an exemplary operation of a driver including an auxiliary transistor according to examples of the disclosure.

FIG. 5B illustrates a process flow, and FIG. 5C illustrates a timing diagram of an exemplary operation of a driver including an auxiliary transistor, according to examples of the disclosure. The driver 210-1 may not be coupled to the respective string 220 (e.g., the transistors 308 may be off) (step 552 of process 550). The transistor 309 can be turned on (step 554 of process 550). The transistor 309 may be turned on immediately before a time interval, such as shown in FIG. 5C. That is, during time 313L, the transistor 309 may be turned on.

The transistor 309 can be used to bias the driver 210 by creating a high current path from the source $V_{INT}$ 225 to the transistor 332 to charge up the gate to source capacitance of the transistor 332 (step 556 of process 550). In some examples, the time 313L is determined by the time needed for the driver 210 to settle to a targeted bias point.

In step 558, the corresponding driver 210 may be coupled to a string 220 (e.g., by turning one of the transistors 308). The time during which the driver 210 is coupled to a string 220 is indicated as the time 313M in FIG. 5C. In step 560, the transistor 309 can be turned off. In some examples, step 554 and step 556 can occur simultaneously.

Turning on the transistor 309 before the transistor 308 can increase the speed of the driver 210 by increasing the rise and fall time of the drive current $I_{LED}$ 222, which can lead to reduced occurrences of overshoots and undershoots. Additionally, the transistor 309 can be used to create a high current path to help charging parasitic capacitances, which can reduce the amount of charging and discharging current taken from a string 220 when the driver 210 is coupled to another string 220. Increasing the transient response time of a LED driver may be suitable for high frequency operation and may help reduce harmonic noise, which may be audible. In addition, the faster transition times may result in reduce the minimum duty cycle and enhance the dimming resolution.

Exemplary Amplifier with an Idle State

Figure 6A:
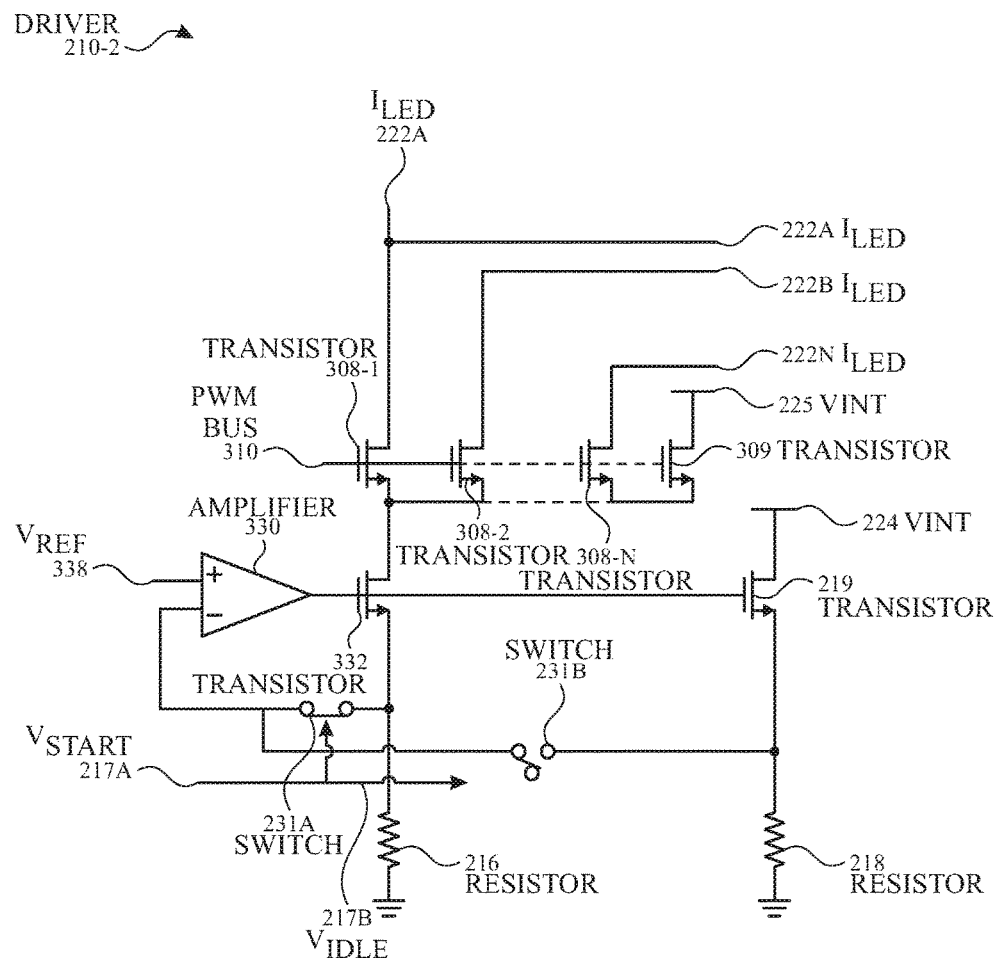
FIG. 6A illustrates a schematic diagram of an exemplary driver including components for operating the driver in an idle state according to examples of the disclosure.

Examples of the disclosure can further include other configurations for the driver, such as one that includes component(s) for maintaining the driver in an idle state. FIG. 6A illustrates a schematic diagram of an exemplary driver 210-2 including components for operating the driver in an idle state according to examples of the disclosure. The driver 210-2 can include one or more components that are correspondingly similar to the driver 210-1 of FIG. 5A. For example, the driver 210-2 can include the set of transistors 308, the transistor 332, the resistor 216, and the amplifier 330. Additionally, the driver 210-2 can receive similar input signals: $V_{REF}$ 338, the PWM bus 310, and the drive currents $I_{LED}$ 222.

The driver 210-2 may also include an idle transistor 219, a resistor 218, and switches 231. The transistor 219 can have a first source/drain terminal coupled to a voltage source $V_{INT}$ 224, a gate terminal coupled to an output of the amplifier 330, and a second source/drain terminal coupled to ground through a resistor 218. Although the figure illustrates the driver 210-2 as including the transistor 309 and source $V_{INT}$ 225, examples of the disclosure can include a driver that does not include both the auxiliary transistor 309 and an idle transistor 219.

The driver 210-2 can include a plurality of switches 231A and 231B coupled to an input signal $V_{START}$ 217A and an idle signal $V_{IDLE}$ 217B. The input signal $V_{START}$ 217A and idle signal $V_{IDLE}$ 217B can control the switches 231 to couple the operational amplifier 330 to certain components regulating the drive current $I_{LED}$ 222. When the driver 210-2 is controlling the drive current $I_{LED}$ 222 of a string 220, the switch 231A can couple the operational amplifier 330 to the transistor 332 and the resistor 216, thereby forming a feedback loop in the current regulation circuit.

When the driver 210-2 is not controlling the drive current $I_{LED}$ 222 of a string 220, the switch 231B can couple the operational amplifier 330 to transistor 219 and the resistor 218. While coupling the amplifier 330 to the transistor 219 and the resistor 218, a low current path can exist in the driver 210-2, thereby maintaining the feedback and keeping the output of the amplifier 330 at a certain bias voltage. In this manner, the driver 210-2 can be kept in regulation (e.g., constant) regardless of the PWM state. In some examples, the idle signal $V_{IDLE}$ 217B coupled to switch 231B can be an inverted signal of input signal $V_{START}$217. In some examples, the inverted input signal can be generated by inputting $V_{START}$217A to an inverting amplifier (not shown).

In some instances, the use of both PWM dimming and analog dimming to adjust the brightness of the display may lead to increased non-linearity due to the need for transitions between PWM dimming and analog dimming methods. The use of both dimming methods may also lead to overlaps between the driver current's falling edge and subsequent rising edge at high duty cycles.

In other instances, the power efficiency of the driver 210-2 may be enhanced due to the output of amplifier 330 being capable of being kept constant. The low current path can reduce the need for the amplifier 330 to slew and respond fast, while the driver 210 is being coupled to another string 220. In some examples, since the need for amplifier 330 to respond quickly (e.g., high bandwidth, fast response) is reduced, the required quiescent current for the drivers may be reduced. Due to the improved power efficiency, analog dimming may not be required at high brightness (e.g., PWM dimming can be used solely for all brightness levels) to improve power efficiency. As such, linearity may be increased and offset currents may be reduced.

As discussed above, the driver 210-2 can be operated such that the transistor 219 and the voltage source $V_{INT}$ 224 create a low current path to keep the amplifier 330 on. Keeping the amplifier 330 on can help achieve faster rise and fall times. In some examples, one or more components can be configured to achieve this low current path. For example, the transistor 219 can be configured such that it is smaller (e.g., N times smaller in size) than the transistor 332. As another example, $V_{INT}$ 224 can be such that the current through the transistor 219 can be smaller than the drive current $I_{LED}$ 222. Additionally or alternatively, the resistor 218 can be configured with a resistance that is larger (e.g., N times larger) than resistor 216.

Figure 6B:
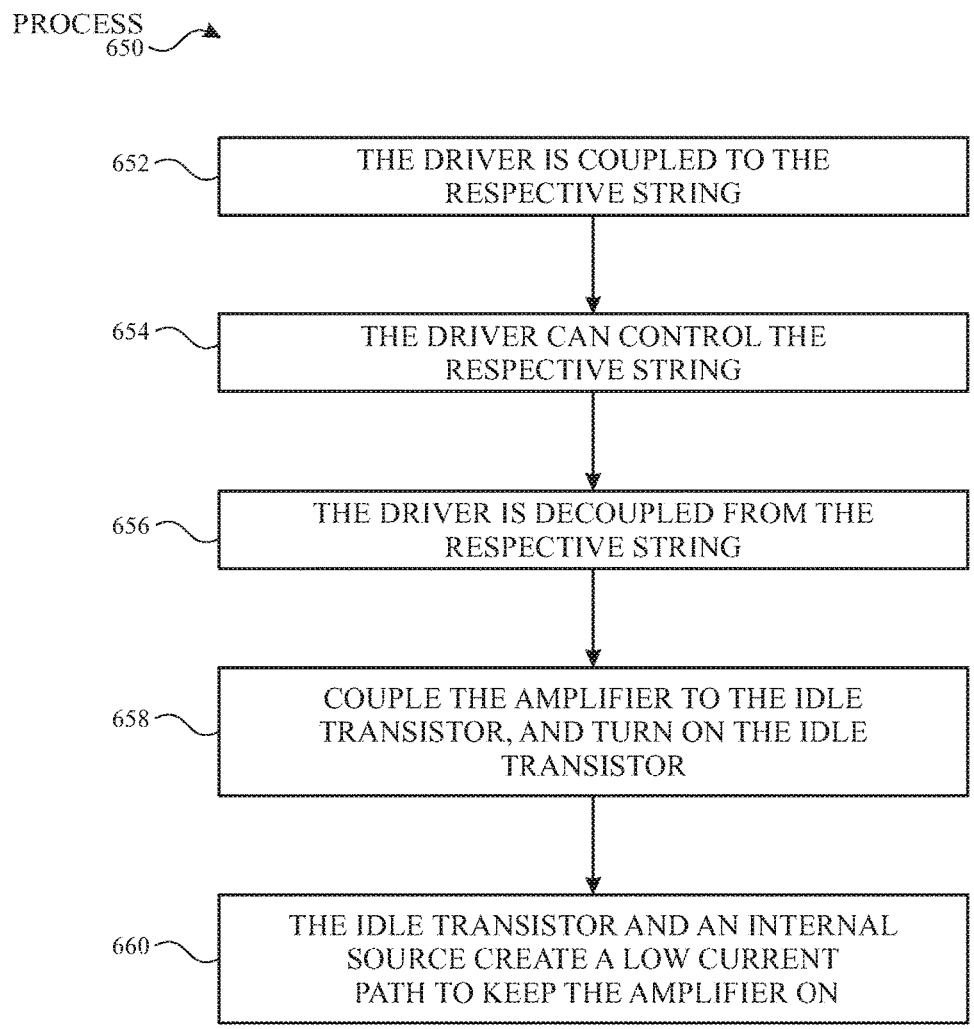
FIG. 6B illustrates a process flow of an exemplary operation of a driver in an idle state according to examples of the disclosure.

FIG. 6B illustrates an exemplary process flow for operating an amplifier of a driver in an idle mode according to examples of the disclosure. The driver 210-2 may be coupled to the respective string 220 (step 652 of process 650). When the driver 210-2 is to be coupled to the respective string 220, the amplifier 330 may be coupled to the transistor 332, and the switch 231B may cause the amplifier 330 to be decoupled from the idle mode transistor 219. The driver 210-2 may then control the respective string in step 654.

In step 656, the driver 210-2 may be decoupled from the respective string 220. This step may include turning off the transistor 308. Additionally, this step may include using the signal $V_{START}$ to control the switches 231. The switch 231A may decouple the amplifier 330 from the transistor 308.

In step 658, the switch 231B can couple the amplifier 330 to the transistor 219, and the transistor 219 can be turned on. The transistor 219, along with the source $V_{INT}$ 222, can create a low current path to keep the amplifier 330 on (step 660 of process 650).

Exemplary Phase Shifting Techniques

In some instances, the use of phase shifting in LED currents can lead to many benefits such as reduced ripple with the input and output voltage signals, reduced need for large output capacitors to dampen out the noise, reduced audible noise, reduced load transients, and reduced spreading in the light output (which can reduce the video and audio interference from the backlight unit). Conventional phase shifting techniques may consume more power and be noisy because each LED string may be separately driven by a unique driver, causing additional switching noise and offset currents when the falling edge of the drive current from one driver overlaps with the rising edge of the drive current from another driver.

Examples of the disclosure can include a second string that can be turned on right after a first string is turned off. In this manner, switching between drivers can be reduced. The reduced switching may lead to improved power efficiency and performance.

Figure 7A:
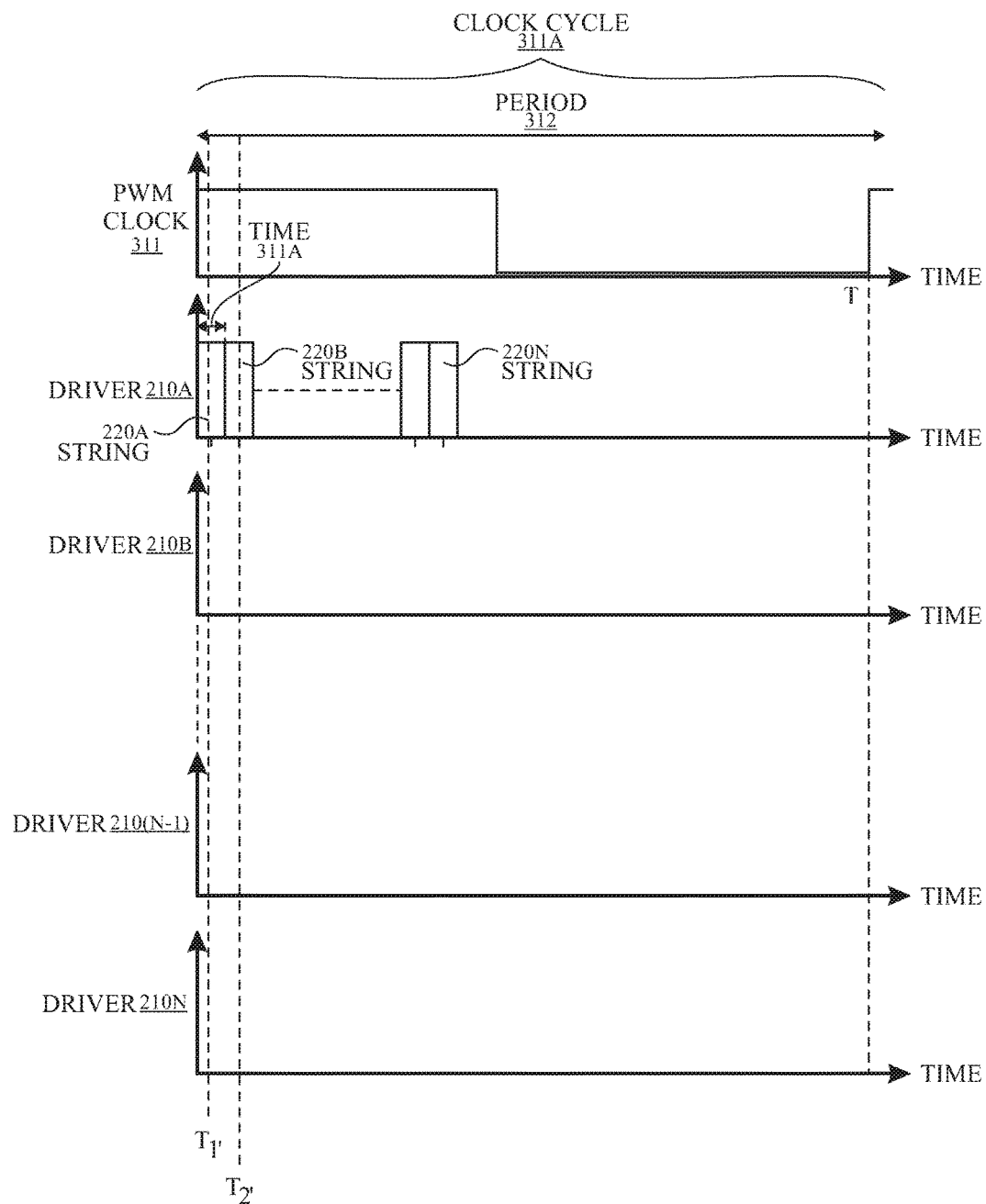
FIGS. 7A-7E illustrate timing diagrams of exemplary operations, which can include phase shifting, of a set of strings according to examples of the disclosure.

FIG. 7A illustrates a timing diagram of an exemplary operation, which includes phase shifting, of a set of strings controlled by a single driver according to examples of the disclosure. The strings 220 can be controlled by the driver 210A. The operation of the strings can be similar to that discussed above with FIG. 4A and FIG. 4B, where one string (e.g., string 220A) can turned on and turned off before another string (e.g., string 220B) is turned on. Specifically, in the example illustrated in FIG. 7A, the strings turn on and off right after another. As a result, the driver 210A can stay on and can be rotated (e.g., switched to being coupled to a different string) as the strings 220 are driven sequentially. Having the driver 210A stay on while the strings 220 are being controlled can result in reduced overlaps, offset currents, noise, power consumption, or a combination thereof.

In some examples, for a second clock cycle (e.g., clock cycle 311B; not shown), a different driver (e.g., driver 210B) can be used to control the set of strings 220. In a third clock cycle, yet another driver can be used, etc. In some examples, all of the drivers 210 can be used in all of the clock cycles, and the drive current $I_{LED}$ 222 through each string 220 can be averaged over the N clock cycles to reduce the effect of mismatches between the drive currents $I_{LED}$ 222.

As mentioned above, a driver 210 may be activated at different times of a clock cycle. As shown in FIG. 7A, control of the string 220A (e.g., the pulse signal) by driver 210A can be centered at time $T_1$; control of the string 220A (e.g., the pulse signal) by driver 210A can centered at time $T_2$, etc. In some instances, $T_1$ may occur after the rising edge of the PWM clock 311.

Figure 7B:
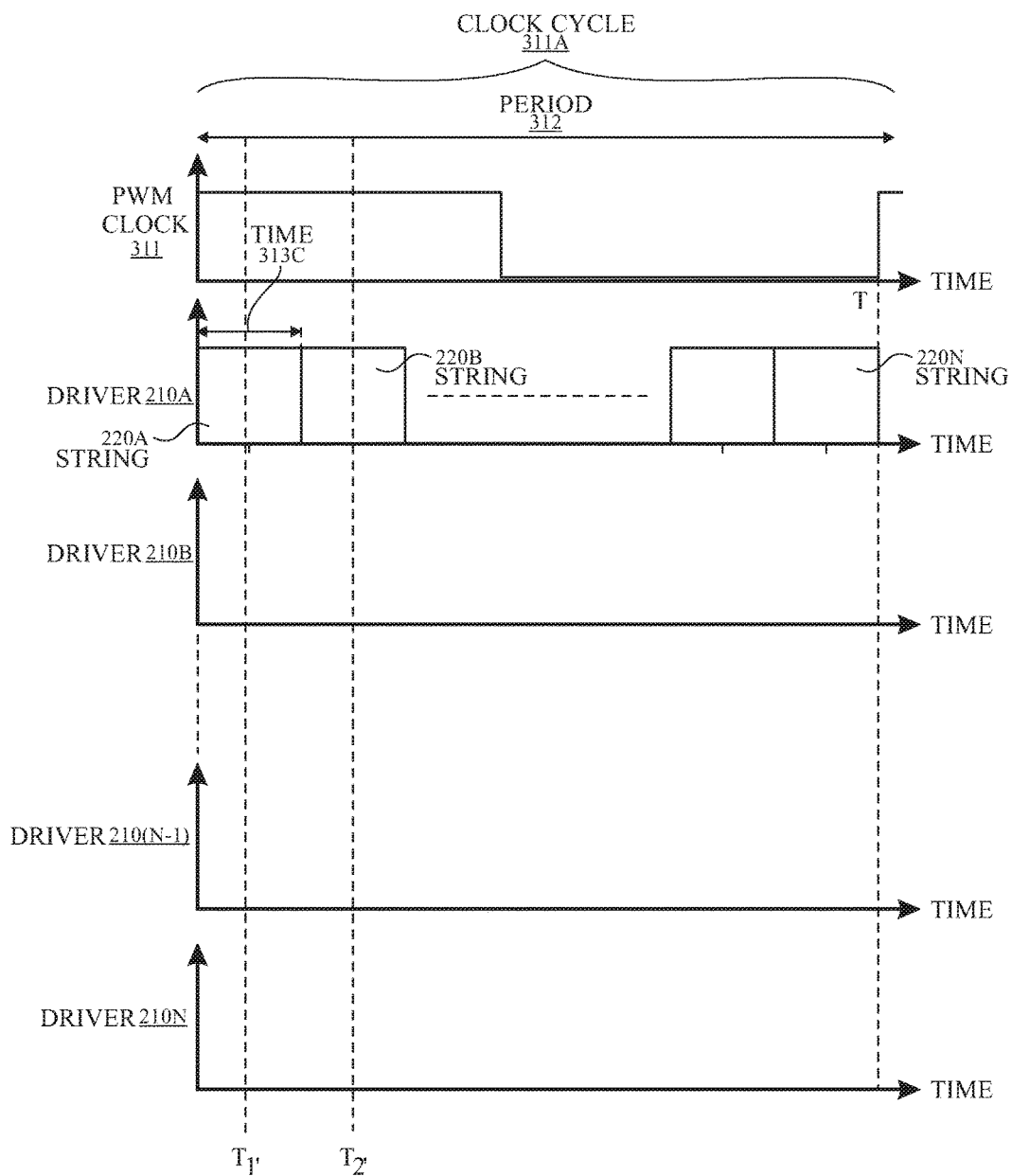

Examples of the disclosure can further include applying the same technique to FIG. 4B, as shown with the timing diagram in FIG. 7B. In this example, each pulse associated with each of the strings 220 may be equal to the period 312 divided by N.

In some examples, more than one driver may be needed, such as in the operation shown in FIG. 4C. As discussed above, the strings 220 can be turned on for the time 313D, and then turned off sequentially such that a first string is turned off while a second string is turned on. In this example, since the pulses associated with the strings may be greater than the period 312 divided by N, more than one driver 210 may be needed to turn all the strings on and off. As illustrated, the number of drivers 210 that may be needed to drive all the set of strings during a single clock cycle 311 equals two. Strings 220A to 220(N−1) can turned on and turned off before another string (e.g., string 220B) is turned on while driver 210A stays on. Since there may be insufficient remaining time to drive string 220N, the driver 210B can be used to drive string 220N.

Figure 7C:
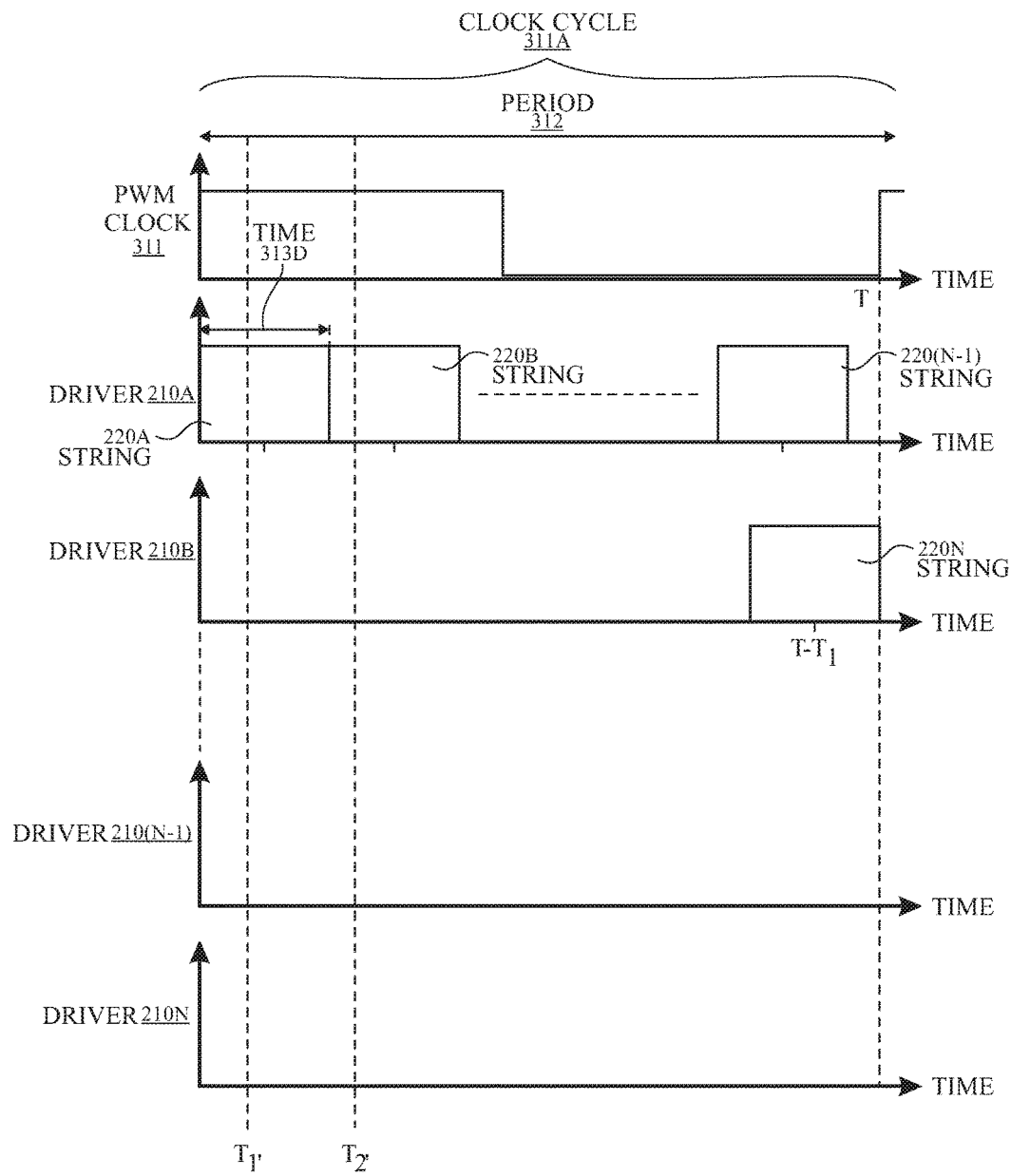

In some examples, a single driver can be used to control as many strings as it can. In some examples, the maximum number of strings that a driver can control can be equal to the period 312 divided by the pulse width (e.g., time 313D). The remainder of the strings can be controlled with another driver. As shown in the example of FIG. 7C, the driver 210A can control most the strings 220. Having the driver 210A stay on while the string 220A to string 220(N−1) are being controlled can result in reduced overlaps, offset currents, noise, and power consumption. Another driver, such as the driver 210B, can be used to control the remainder string: string 220N.

In some examples, for a second clock cycle (e.g., clock cycle 311B; not shown), different drivers (e.g., drivers 210C and 210D) can be used to control the set of strings 220. In a third clock cycle, yet another driver can be used, etc. In some examples, all of the drivers 210 can be used in clock cycles, and the drive current $I_{LED}$ 222 through each string 220 can be averaged over the N clock cycles to reduce the effect of mismatches between the drive currents $I_{LED}$ 222.

Figure 7D:
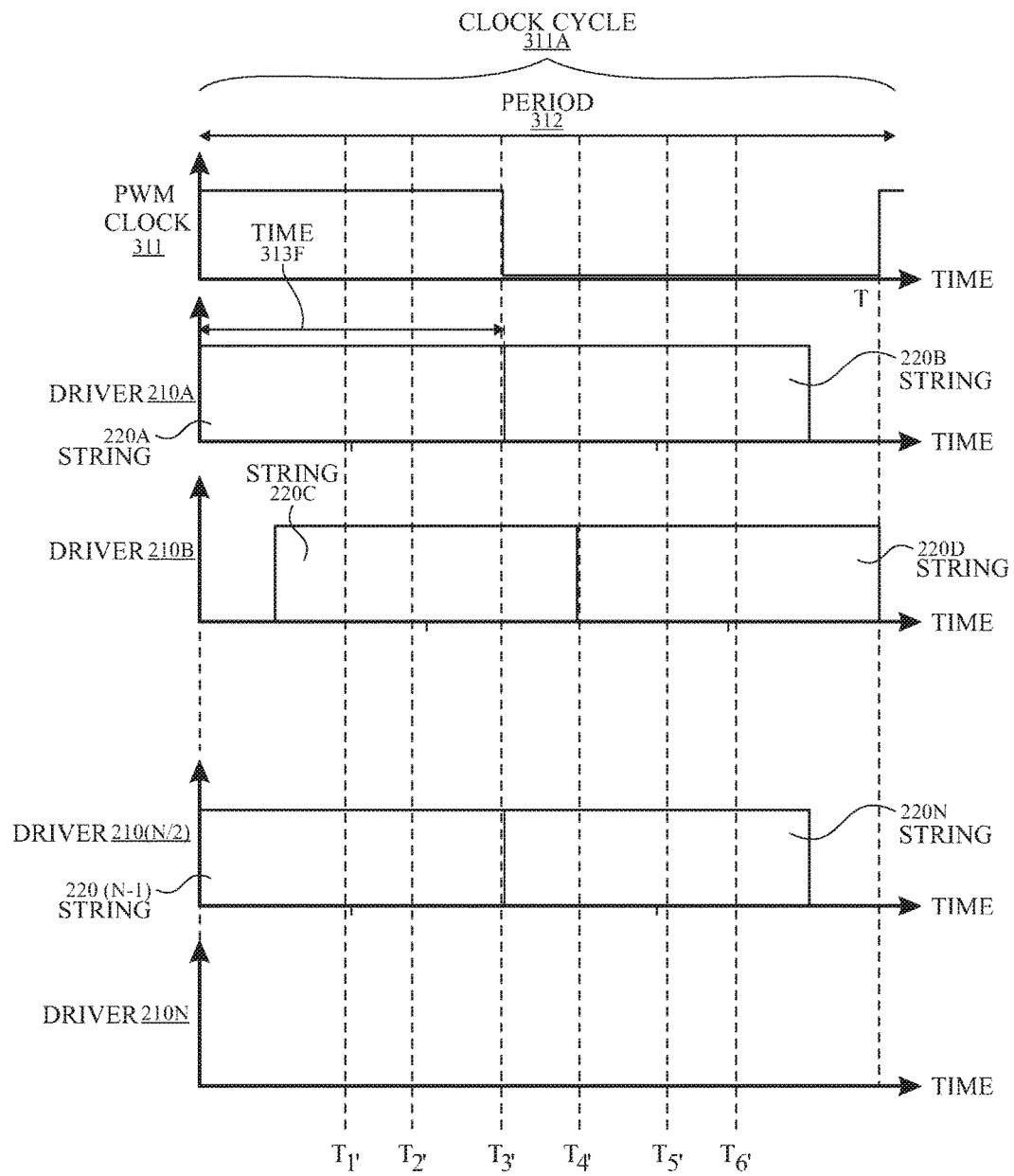

In some examples, multiple drivers can operate simultaneously. For example, as shown in the FIG. 7D, control of some (e.g., half) of the strings (e.g., pulse signals associated with the strings) by driver 210A to driver 210(N/2) can be centered at time $T_1$. For example, every other (e.g., "odd") string of the set of strings 220A-220N can be controlled at this time. The drivers may also switch to controlling different strings, for example, "even" strings of 220A-220N, centered at the time $T_2$. In some examples, control of the second portion of the strings can be delayed, relative to the first half, so that the drive currents can be distributed in time. In some instances, the delay for a second driver (e.g., driver 210B) may be equal to the period 312 minus the total pulse widths of strings being driven by the second driver (e.g., as illustrated, period 312 minus two times the time 313F).

In some examples, for a second clock cycle (e.g., clock cycle 311B; not shown), different drivers can be used to control the set of strings 220 (e.g., using driver 210A to control strings 220C and 220D, using driver 210B to control strings 220A and 220B). In a third clock cycle, different drivers can be used for each string, etc. In some examples, all of the drivers 210 can be used in the clock cycles, and the drive current $I_{LED}$ 222 through each string 220 can be averaged over the N clock cycles to reduce the effect of mismatches between the drive currents $I_{LED}$ 222.

In some examples, the duty cycle of the LED currents may be over 50%. In other words, for a given period, a driver may not be able to drive at least two strings immediate after one another. In these examples, to ensure uniformity of the display brightness, at least two (e.g., each) of the drivers can turn on at a different time of the period. For example, the drivers can turn on at every increment of the period divided by N.

Figure 7E:
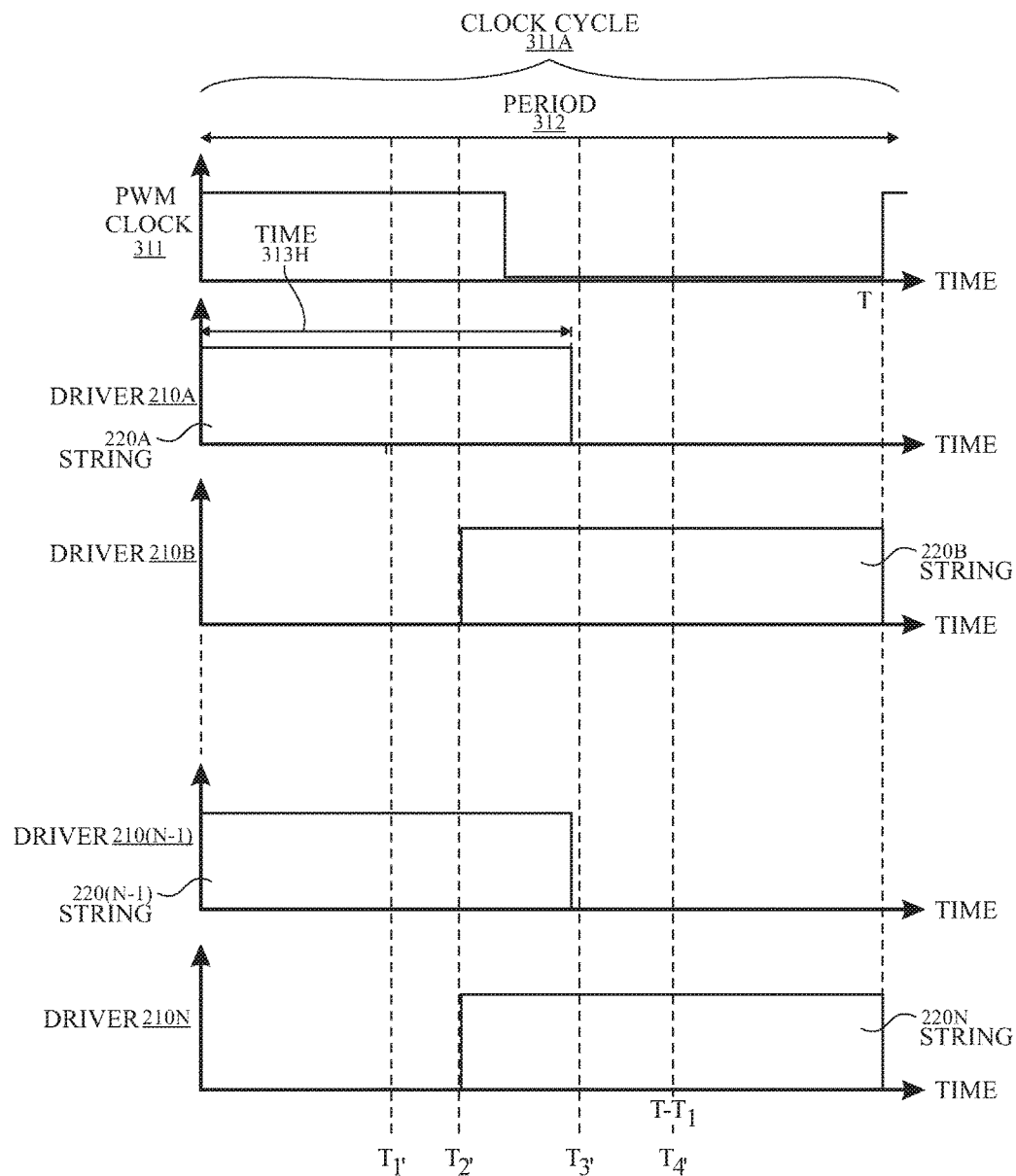

In some examples, multiple drivers can be operated simultaneously, such as the driver 210A to control the string 220A; the driver 210C to control the string 220C; the driver 210(N−1) to control the string 220(N−1); and so on, as shown in FIG. 7E. At a second time, driver 210B can control the string 220B; the driver 210D can control the string 220D; the driver 210N can control the string 220N; and so on. There may also be a delay between drivers, such as a delay $T_2$ for the drivers 210B, 210D, 210N, etc. In some instances, the delay for a second driver (e.g., driver 210B) may be equal to the period 312 minus the time 313H (e.g., LED current pulse width). In some examples, a driver 210 may control only one string for each clock cycle 311.

In some instances, when duty cycle of the driver current is over 50%, for a second clock cycle (e.g., clock cycle 311B; not shown), different drivers can be used to control the set of strings 220 (e.g., using driver 210A to control string 220B, using driver 210B to control string 220C, etc.). In a third clock cycle, different drivers can be used for each string, etc. In some examples, all of the drivers 210 can be used in the clock cycles, and the drive current $I_{LED}$ 222 through each string 220 can be averaged over the N clock cycles to reduce the effect of mismatches between the drive currents $I_{LED}$ 222.

In some examples, as discussed above, the backlight circuit may change which driver 210 controls a given string for, e.g., different clock cycles. For example, the string 220A can be controlled by the driver 210A during the clock cycle 311A, but may be controlled by the driver 210B during the clock cycle 311B, etc.

Various functions described above can be implemented in digital electronic circuit, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuit. General and special purpose computer devices and storage devices can be interconnected through communication networks.

Some implementations include electronic components, such as microprocessors, storage, and memory that can store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer," "processor," and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speed, or tactile input.

Many of the above-described features and applications are implemented as software processes that are specified as a set of instructions recorded on a computer readable storage medium (also referred to as a computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, or subroutine, object, or other component suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in some instances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein the reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

The predicate words "configured to," "operable to," "capable of," and "programmed to" do not imply any particular tangible or intangible modification of a subject, but, rather, are intended to be used interchangeably. For example, a processor configured to monitor and control an operation or a component may also mean the processor being programmed to monitor and control the operation, or the processor being operable to monitor and control the operation. Likewise, a processor configured to execute code can be construed as a processor programmed to execute code or operable to execute code.

The word "example" is used herein to mean "serving as an example or illustration." Any aspect or design described herein as "example" is not necessarily to be construed as preferred or advantageous over other aspects or designs.

A circuit is disclosed. The circuit can comprise: a first source; a set of drivers, each of the set of drivers comprising: a set of first transistors, each first transistor coupled to a pulse-width modulation (PWM) signal; a first resistor; a second transistor, the second transistor coupled to the set of first transistors and the first resistor; and an operational amplifier coupled to the second transistor; and a set of strings of series-connected light emitting diodes (LEDs), wherein the set of strings of series-connected LEDs is coupled to the set of drivers and the first source, such that a respective one of the set of drivers is configured to connect to any one of the set of strings of series-connected LEDs. Additionally or alternatively, in some examples, the circuit further comprises a second source, wherein at least one of the set of drivers further comprises a third transistor, the third transistor coupled to the second transistor and the second source. Additionally or alternatively, in some examples, the third transistor is coupled to the set of first transistors. Additionally or alternatively, in some examples, the third transistor is coupled to the operational amplifier. Additionally or alternatively, in some examples, the at least one of the set of drivers further comprises a fourth transistor coupled to the set of first transistors. Additionally or alternatively, in some examples, the circuit further comprises: an inverting amplifier coupled to an input signal; a first switch controlled by the input signal and capable of coupling the operational amplifier to the second transistor; and a second switch controlled by an inverted input signal and capable of coupling the operational amplifier to the third transistor. Additionally or alternatively, in some examples, the circuit further comprises: a negative feedback loop, the negative feedback loop including: the operational amplifier; the second transistor when the first switch couples the operational amplifier to the second transistor; and the third transistor when the second switch couples the operational amplifier to the third transistor. Additionally or alternatively, in some examples, the third transistor and the set of first transistors are turned on at different times. Additionally or alternatively, in some examples, the PWM signals received by the first set of first transistors form a PWM bus.

A method for operating a display is disclosed. The method can comprise: turning on a set of LED strings in a round using a first set of one or more LED drivers, wherein the turning on of the set of LED strings in the round includes: at a first time interval, coupling a first LED string to a first driver, the first LED string included in the set of LED strings, and the first driver included in the first set of one or more LED drivers; at a second time interval: in accordance with a determination that the first driver is coupled, coupling a second LED string to a second driver, the second LED string included in the set of LED strings, and the second driver included in the first set of one or more LED drivers; and in accordance with a determination that the first driver is not coupled to a LED string, coupling the second LED string to the first driver. Additionally or alternatively, in some examples, the method further comprises: turning on the set of LED strings in another round using a second set of one or more LED drivers. Additionally or alternatively, in some examples, a number of drivers in the first set of one or more LED drivers is one, and the set of LED strings comprises all of the LED strings in the display. Additionally or alternatively, in some examples, the method further comprises: decoupling the first LED string from the first driver, wherein a time duration between the decoupling of the first LED string from the first driver and the coupling of the second LED string to the first driver is zero seconds. Additionally or alternatively, in some examples, the turning on of the set of LED strings in the round includes: at a third time interval: in accordance with a determination that the first driver is not coupled to a LED string, coupling a third LED string to the first driver, the third LED string included in the set of LED strings. Additionally or alternatively, in some examples, the turning on of the set of LED strings in the round includes: at a third time interval: in accordance with a determination that the first driver is coupled to at least one LED string, determining whether the second driver is coupled to at least one LED string; and in accordance with a determination that the second driver is coupled to at least one LED string, coupling a third LED string to a third driver, the third LED string included in the set of LED strings, and the third driver included in the first set of one or more LED drivers. Additionally or alternatively, in some examples, the method further comprises: turning on the set of LED strings in another round using the first set of one or more LED drivers, wherein a respective order that the drivers in the first set of one or more LED drivers are coupled in the round differs from a respective order in the another round. Additionally or alternatively, in some examples, the turning on of the set of LED strings in the round further comprises: prior to the coupling of the first LED string to the first driver: coupling an internal source to the first driver using an auxiliary transistor; and charging the first driver. Additionally or alternatively, in some examples, the method further comprises: operating at least one driver of the first set of one or more LED drivers in an idle state, wherein the operation includes: coupling of an amplifier of the at least one driver to an idle transistor; and maintaining an output voltage of the amplifier. Additionally or alternatively, in some examples, the amplifier is coupled to the idle transistor when the amplifier is not coupled to the second transistor. Additionally or alternatively, in some examples, the method further comprises: delaying the coupling of the first LED string to the first driver by a non-zero amount of time.

Although examples have been fully described with reference to the accompanying drawings, it is to be noted that various changes and modifications will become apparent to those skilled in the art. Such changes and modifications are to be understood as being included within the scope of the various examples as defined by the appended claims.

The invention claimed is:

1. A circuit comprising:
   a first source;
   a second source;
   a set of drivers, each of the set of drivers comprising:
      a set of first transistors, each first transistor coupled to a pulse-width modulation (PWM) signal;
      a first resistor;
      a second transistor, the second transistor coupled to the set of first transistors and the first resistor;
      a third transistor, the third transistor coupled to the second transistor and the second source; and
      an operational amplifier coupled to the second transistor; and
   a set of strings of series-connected light emitting diodes (LEDs), wherein the set of strings of series-connected LEDs is coupled to the set of drivers and the first source, such that a respective one of the set of drivers is configured to connect to any one of the set of strings of series-connected LEDs.

2. The circuit of claim 1, wherein the third transistor is coupled to the set of first transistors.

3. The circuit of claim 1, wherein the third transistor is coupled to the operational amplifier.

4. The circuit of claim 3, wherein the at least one of the set of drivers further comprises a fourth transistor coupled to the set of first transistors.

5. The circuit of claim 3, further comprising:
   an inverting amplifier coupled to an input signal;
   a first switch controlled by the input signal and capable of coupling the operational amplifier to the second transistor; and
   a second switch controlled by an inverted input signal and capable of coupling the operational amplifier to the third transistor.

6. The circuit of claim 5, further comprising:
   a negative feedback loop, the negative feedback loop including:
      the operational amplifier;
      the second transistor when the first switch couples the operational amplifier to the second transistor; and
      the third transistor when the second switch couples the operational amplifier to the third transistor.

7. The circuit of claim 1, wherein the third transistor and the set of first transistors are turned on at different times.

8. The circuit of claim 1, wherein the PWM signals received by a first set of first transistors form a PWM bus.

9. A method for operating a display, the method comprising:
   turning on a set of LED strings in a round using a first set of one or more LED drivers, wherein the turning on of the set of LED strings in the round includes:
      at a first time interval, coupling a first LED string to a first driver, the first LED string included in the set of LED strings, and the first driver included in the first set of one or more LED drivers;
      at a second time interval:
         in accordance with a determination that the first driver is coupled, coupling a second LED string to a second driver, the second LED string included in the set of LED strings, and the second driver included in the first set of one or more LED drivers; and
         in accordance with a determination that the first driver is not coupled to a LED string, coupling the second LED string to the first driver.

10. The method of claim 1, further comprising:
    turning on the set of LED strings in another round using a second set of one or more LED drivers.

11. The method of claim 1, wherein a number of drivers in the first set of one or more LED drivers is one, and the set of LED strings comprises all LED strings in the display.

12. The method of claim 1, further comprising:
    decoupling the first LED string from the first driver,
    wherein a time duration between the decoupling of the first LED string from the first driver and the coupling of the second LED string to the first driver is zero seconds.

13. The method of claim 1, wherein the turning on of one of the set of LED strings in the round includes:
    at a third time interval:
       in accordance with a determination that the first driver is not coupled to one of the set of LED strings, coupling a third LED string to the first driver, the third LED string included in the set of LED strings.

14. The method of claim 1, wherein the turning on of the set of LED strings in the round includes:
    at a third time interval:
       in accordance with a determination that the first driver is coupled to at least one LED string, determining whether the second driver is coupled to at least one LED string; and
       in accordance with a determination that the second driver is coupled to at least one LED string, coupling a third LED string to a third driver, the third LED string included in the set of LED strings, and the third driver included in the first set of one or more LED drivers.

15. The method of claim 1, further comprising:
    turning on the set of LED strings in another round using the first set of one or more LED drivers, wherein a respective order of the first set of one or more LED drivers that the drivers in the first set of one or more LED drivers are coupled in the round differs from a respective order in the another round.

16. The method of claim 1, wherein the turning on of the set of LED strings in the round further comprises:
    prior to the coupling of the first LED string to the first driver:
       coupling an internal source to the first driver using an auxiliary transistor; and
       charging the first driver.

17. The method of claim 1, further comprising:
    operating at least one driver of the first set of one or more LED drivers in an idle state, wherein the operation includes:
    coupling of an amplifier of the at least one driver to an idle transistor; and
    maintaining an output voltage of the amplifier.

18. The method of claim 17, wherein the amplifier is coupled to the idle transistor when the amplifier is not coupled to a second transistor.

19. The method of claim 1, further comprising:
    delaying the coupling of the first LED string to the first driver by a non-zero amount of time.

* * * * *